(12) United States Patent
Chang et al.

(10) Patent No.: US 9,269,031 B2
(45) Date of Patent: Feb. 23, 2016

(54) METHOD OF DETECTING REGIONS IN AN EDGE-BASED REPRESENTATION

(71) Applicant: CANON KABUSHIKI KAISHA, Tokyo (JP)

(72) Inventors: Wen Shan Chang, Macquarie Park (AU); David Karlov, Emu Plains (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/575,973

(22) Filed: Dec. 18, 2014

(65) Prior Publication Data

US 2015/0178605 A1    Jun. 25, 2015

(30) Foreign Application Priority Data

Dec. 20, 2013    (AU) .................................. 2013273787

(51) Int. Cl.
     *G06K 15/00*      (2006.01)
     *G06K 15/02*      (2006.01)
     *G06T 11/60*      (2006.01)

(52) U.S. Cl.
     CPC ............ *G06K 15/1849* (2013.01); *G06T 11/60* (2013.01)

(58) Field of Classification Search
None
See application file for complete search history.

(56) References Cited

U.S. PATENT DOCUMENTS

| | | | | |
|---|---|---|---|---|
| 5,119,440 A * | 6/1992 | Duenyas et al. | ............. | 382/199 |
| 5,125,038 A * | 6/1992 | Meshkat et al. | ............. | 382/154 |
| 5,478,777 A | 12/1995 | Yamazaki | | |
| 6,049,339 A | 4/2000 | Schiller et al. | | |
| 6,870,954 B1 * | 3/2005 | Gupta | ..................... | G06T 11/40 345/441 |
| 7,127,107 B2 * | 10/2006 | Kubota et al. | ................. | 382/199 |
| 7,974,457 B2 * | 7/2011 | Tounai | ........................... | 382/144 |
| 8,059,885 B2 * | 11/2011 | Tirapu-Azpiroz | ....... | G03F 1/144 382/144 |
| 8,238,640 B2 * | 8/2012 | Sun et al. | ...................... | 382/141 |
| 8,655,049 B2 * | 2/2014 | Yanai | ............................. | 382/141 |
| 8,786,652 B2 * | 7/2014 | Furukawa et al. | ............ | 347/234 |
| 8,805,056 B2 * | 8/2014 | Bala et al. | ....................... | 382/154 |
| 8,937,702 B2 * | 1/2015 | Rimai et al. | .................... | 352/69 |
| 2003/0198398 A1 * | 10/2003 | Guan et al. | ..................... | 382/255 |

OTHER PUBLICATIONS

M. Gangnet; J.-C. Hervé; T. Pudet; J.-M. van Thong. Incremental computation of planar maps. SIGGRAPH Comput. Graph. 1989, 23, pp. 345-354.

\* cited by examiner

*Primary Examiner* — Dung Tran
(74) *Attorney, Agent, or Firm* — Canon USA Inc. IP Division

(57) ABSTRACT

A method receives an intermediate graphical representation (IGR) of a document, the IGR including a plurality of non-intersecting edges and determines a plurality of vertices using the IGR. The vertices include endpoints of the edges and a split point, being determined by splitting a first edge into two or more portions using an endpoint of at least one second edge, wherein the first edge and the second edge are from the plurality of non-intersecting edges, associates vertices from the plurality of vertices with at least one edge from the IGR using endpoints of the one edge, wherein the associating includes selecting, from the determined plurality of vertices, a plurality of neighbouring vertices to said one edge to define a region with the endpoints of the one edge. The method processes the region using at least the endpoints of said one edge and the associated neighbouring vertices.

20 Claims, 19 Drawing Sheets

| edge | "anchor" vertex | Y value of "anchor" vertex | "connecting" edge | "connecting" vertex | |
|---|---|---|---|---|---|
| 101 | 311 | 0 | 204 | 317 | |
|  | 312 | 7 | 204 | 320 | ~ 342 |
| 102 | 313 | 1 | 103 | 315 | ~ 343 |
|  | 314 | 6 | 103 | 316 | |
| 103 | 315 | 1 | 102 | 313 | ~ 345 |
|  |  | 1 | 204 | 318 | ~ 346 |
|  | 316 | 6 | 102 | 314 | ~ 347 |
|  |  | 6 | 204 | 319 | ~ 348 |
| 204 | 317 | 0 | 101 | 311 | ~ 349 |
|  | 318 | 1 | 103 | 315 | ~ 350 |
|  | 319 | 6 | 103 | 316 | ~ 351 |
|  | 320 | 7 | 101 | 312 | ~ 352 |

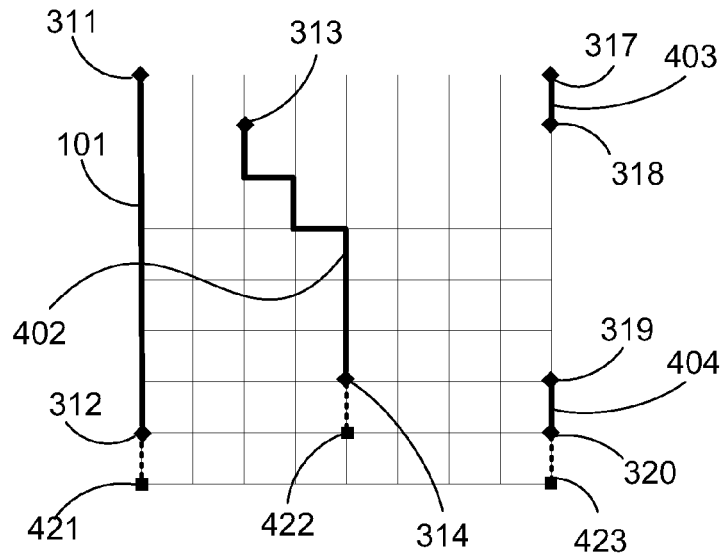
Fig. 4A
| Sub Edge | "start" vertex | "end" vertex |
|---|---|---|
| 404 | 320 | 319 |
| 402 | 314 | 313 |
| 403 | 318 | 317 |
Fig. 4B
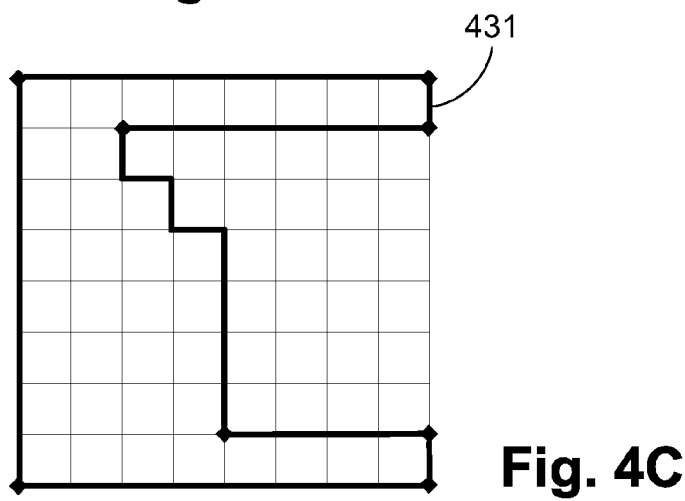
Fig. 4C

METHOD OF DETECTING REGIONS IN AN EDGE-BASED REPRESENTATION

REFERENCE TO RELATED PATENT APPLICATION(S)

This application claims the benefit under 35 U.S.C. §119 of the filing date of Australian Patent Application No. 2013273787, filed Dec. 20, 2013, hereby incorporated by reference in its entirety as if fully set forth herein.

TECHNICAL FIELD

The present invention relates generally to computer based printer system, and in particular, to converting an edge-based representation into an intermediate non-overlapping object-based representation.

BACKGROUND

In some printing architectures, measures such as removing overlapping objects, combining complex objects, and flattening compositing stacks are highly desirable steps to take. In some cases, some components in a printing architecture may only partially support a drawing interface over which graphical objects are sent, and so such steps are necessary to successfully print any print job. In other cases, such steps are desirable to improve the performance of a subsequent rasterisation processing step.

An object-based graphics system known as a Raster Image Processor (RIP) can generate an intermediate graphic representation of a page from a PDL (page description language) document, such as a PDF or PostScript document. The intermediate graphic representation represents the same page as the original PDL document, but in a format more suitable for rendering by a printer engine onto a print media, such as paper. One such intermediate graphic representation format is an edge-based representation, where each region is encoded only by an activating edge and colour data associated with the activating edge. This format is efficient for rasterising the page into an image as all overlapping regions have been resolved. This format is therefore also highly suited to processing steps often performed by a rasterisation module, such as combining complex objects and flattening compositing stacks.

Thus, one way of performing processing steps such as resolving overlaps between objects, combining complex objects, and flattening compositing stacks is to use a RIP system to generate an edge-based representation. One drawback of this approach is that the edge-based representation does not explicitly store the full boundaries of each non-overlapping object. This can hinder subsequent processing steps which rely on knowing the boundaries of each region.

One method of determining the boundaries of each region in an edge-based representation is to rasterise the edge-based representation, and then apply a pixel-wise outline extractor algorithm in order to detect and extract each region. However, this approach is cumbersome and slow as it involves rasterising the entire edge-based representation format into an image first, and then detecting the boundary of the regions by inspecting the image on a pixel-by-pixel basis.

Another method converts a PDL page to an intermediate non-overlapping object representation. However, this method cannot easily be used with a RIP system which efficiently performs processing such as combining complex objects and flattening compositing stacks, because the output of the RIP system is an edge-based representation, not a PDL page representation.

SUMMARY

According to one aspect of the present disclosure, there is provided a method for graphics processing, the method comprising:

receiving an intermediate graphical representation associated with a document, the intermediate graphical representation comprising a plurality of non-intersecting edges;

determining a plurality of vertices using the intermediate graphical representation, the plurality of vertices comprising endpoints of the edges and at least one split point, the split point being determined by splitting a first edge into two or more portions using an endpoint of at least one second edge, wherein the first edge and the second edge are from the plurality of non-intersecting edges;

associating vertices from the plurality of vertices with at least one edge from the intermediate graphical representation using endpoints of said one edge, wherein the associating comprises selecting, from the determined plurality of vertices, a plurality of neighbouring vertices to said one edge to define a region with the endpoints of said one edge; and processing the region using at least the endpoints of said one edge and the associated neighbouring vertices.

Preferably the plurality of neighbouring vertices used to define the region is determined by: (i) identifying vertices arranged within scan lines bounded by the endpoints of the one edge; and (ii) for a scan line comprising at least one of the identified vertices, determining a (first) vertex on a next edge encountered on said scan line after the one edge. Desirably wherein the identified vertices include a (second) vertex which lies on the next edge, the second vertex being the nearest vertex in the set of identified vertices on the next edge to the first vertex, and a portion of the next edge in between the first and second vertices is the nearest to said one edge on the scan lines over which the portion of said one edge is active. The splitting forms a sub-edge representing the portion of the next edge between the first and second vertices.

Advantageously, splitting the first edge into two or more portions comprises selecting the second edge determined by the intermediate graphical representation, so that the second edge is the closest edge to said first edge on a scan line associated with an endpoint of said second edge; and using said endpoint of the second edge to split the first edge. Preferably the splitting further comprises projecting a ray from the endpoint of the second edge to a vertex on the first edge being the split point, and forming a sub-edge between the split point and an endpoint of the first edge.

In another implementation, the association of the vertices with the one edge comprises traversing the determined plurality of vertices by starting from the one edge to form a closed path corresponding to the polygon associated with the one edge.

In a specific implementation, associating the vertices with the one edge comprises:

forming a plurality of bands using the determined plurality of vertices;

obtaining neighbouring sub-edges to said edge formed by the bands by sorting the edges within each band where said edge is present; and associating the obtained neighbouring sub-edges with the edge.

Alternatively or additionally, the associating of the vertices may comprise joining a pair of vertices on the same scan line by a horizontal line.

Most typically, each edge is pixel-aligned, has a direction of activation and a direction of non-activation, and is associated with a fill. Generally the region is associated with the fill of the one edge in the activating region.

In a specific implementation, the document is formed by a plurality of tiles each having an associated intermediate graphical representation, the method further comprising:

for each tile determining a complexity based on the number of edges in the corresponding intermediate graphical representation; and selecting a tile based on the tile complexity to be converted into plurality of said regions.

According to another aspect of the disclosure, provided is a method for graphics processing, the method comprising:

receiving an intermediate graphical representation, the intermediate graphical representation comprising a plurality of non-intersecting edges;

determining a plurality of vertices using the intermediate graphical representation, the plurality of vertices comprising endpoints of the edges and at least one split point, the split point being determined by splitting a first edge into two or more portions using an endpoint of at least one second edge, wherein the first edge and the second edge are from the plurality of non-intersecting edges;

associating an edge from the intermediate graphical representation with at least a split point from the determined plurality of vertices to form a region corresponding to said edge, wherein associating comprises selecting a neighbouring split point to said edge from the determined plurality of vertices; and processing the graphics using the formed region.

According to yet another aspect of the disclosure, provided is a method of converting a first graphical representation to a second graphical representation, comprising:

receiving a first graphical representation of a plurality of non-overlapping regions, the representation comprising partial boundaries of said regions;

determining a plurality of vertices from the partial boundaries, the vertices comprising endpoints of the partial boundaries and at least one split point, the split point being determined by splitting a partial boundary into two or more portions using an endpoint of at least one other partial boundary;

associating a partial boundary from the first graphical representation with at least a split point from the determined plurality of vertices, wherein associating comprises selecting a neighbouring split point to said partial boundary from the determined plurality of vertices;

identifying a graphical object corresponding to said partial boundary by connecting endpoints of said partial boundary with the vertices associated with said partial boundary; and using the identified graphical object to form a second graphical representation.

Other aspects are also disclosed.

BRIEF DESCRIPTION OF THE DRAWINGS

At least one embodiment of the invention will now be described with reference to the following drawings, in which:

FIG. 4A shows the edge 101 and the identified sub-edges for the boundary of the region to the immediate right of the edge 101;

FIG. 4B shows the identified sub-edges for the boundary of the region to the immediate right of edge 101 in a table representation;

FIG. 4C shows the boundary of the region determined for edge 101;

FIG. 16 shows an example of an edge-based representation which is split into sub-edges according to horizontal bands according to the implementation of FIG. 15; and.

DETAILED DESCRIPTION INCLUDING BEST MODE

Context and Overview

Figure 6:
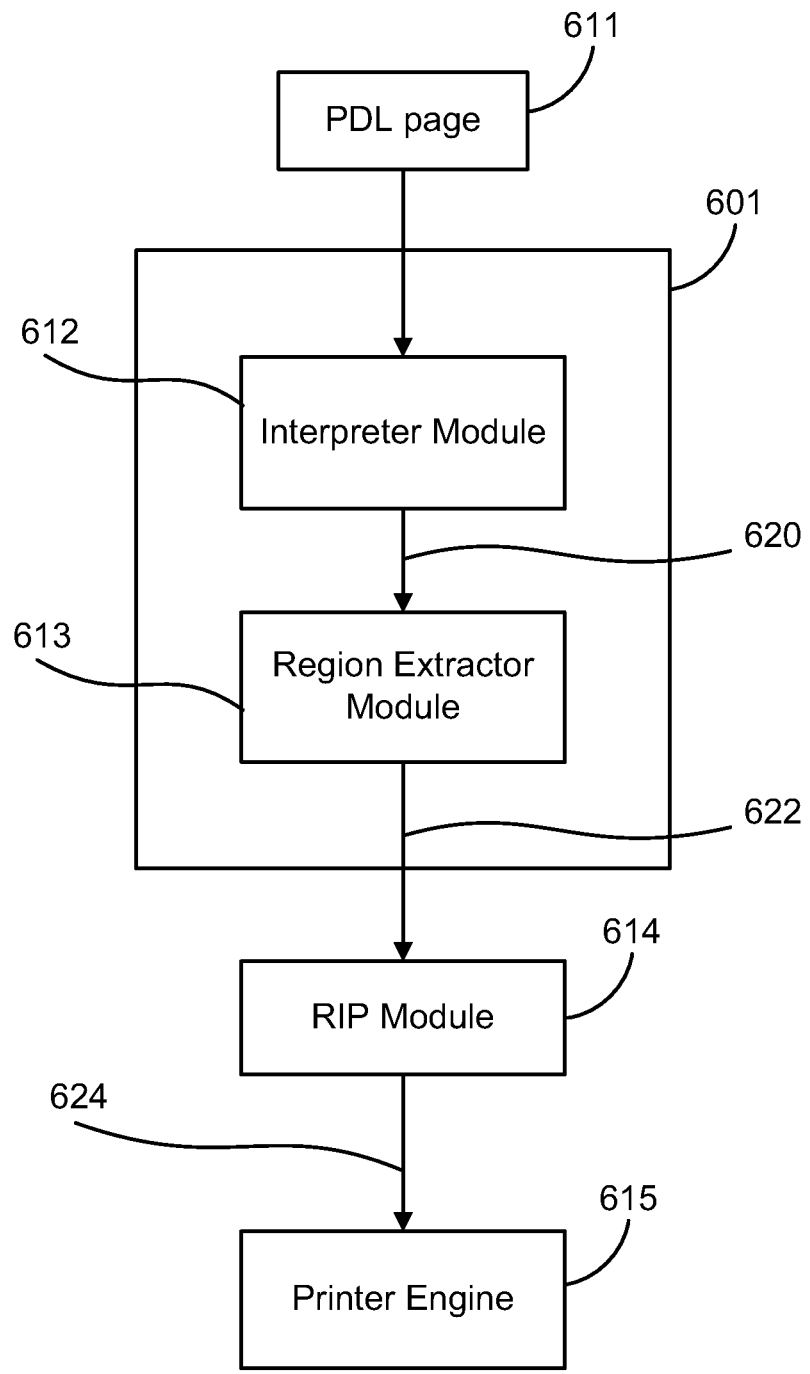
FIG. 6 shows a software architecture for a system to support printing a page on a printer engine which has limited support for handling overlapping graphical objects.

FIG. 6 shows the software architecture for a system 601 to support printing a page on a RIP Module 614 which has limited support for handling overlapping graphical objects. A PDL page 611 forms an input to the system 601 and passes to an Interpreter Module 612 which produces an edge-based representation 620 comprising a plurality of non-intersecting edges. The edge-based representation 620 is passed to Region Extractor Module 613, which produces an object-based representation 622, which is passed to RIP Module 614. The RIP Module 614 applies further processing to the object-based representation 622, and rasterises it into a raster (pixel-based) image 624, which is supplied to Printer Engine 615 within a printer, which prints the raster image onto a physical medium.

In the system 601, each of the edge-based representation 620 and the object-based representation 622 are examples of intermediate graphical representations associated with the PDL document 611 in the overall process of rendering the PDL document 611 to hard copy.

The page is typically described in a Page Description Language (PDL) format such as PDF or PostScript document. The PDL page 611 is passed into Interpreter Module 612 which produces an edge-based representation of the PDL page.

The edge-based representation 620 has a format that contains edges which each represent, and comprise a partial boundary of, a region within the page. In preferred implementations, each edge of the edge-based representation 620:

1. is aligned to pixel boundaries, meaning the pixel-aligned edge consists of a sequence of segments, each of which follows a boundary between adjacent pixels;
2. does not intersect other edges;
3. is monotonic in the y direction;
4. contains a reference to one or more fills, where a fill can be an image, a gradient, a flat colour, etc.; and
5. is referred to as the activating edge of a region.

The corresponding deactivating edge (e.g. the right-side edge) for the region is not stored in the preferred edge-based representation 620. Instead the deactivating edge is implied by the next activating edge on each scan line for which the particular edge is active. For a given scan line, the fills of a region are activated starting from the pixel-aligned edge and progressing to the right. The region remains active until a second pixel-aligned edge (or the right edge of the page) is encountered. The current active fill region is deactivated and the region corresponding to the second edge is activated in turn. Thus, the deactivating edge can comprise of multiple sub-sections from multiple edges and it is a non-trivial task to determine the boundary of a region without rasterising the whole page.

Figure 1A:
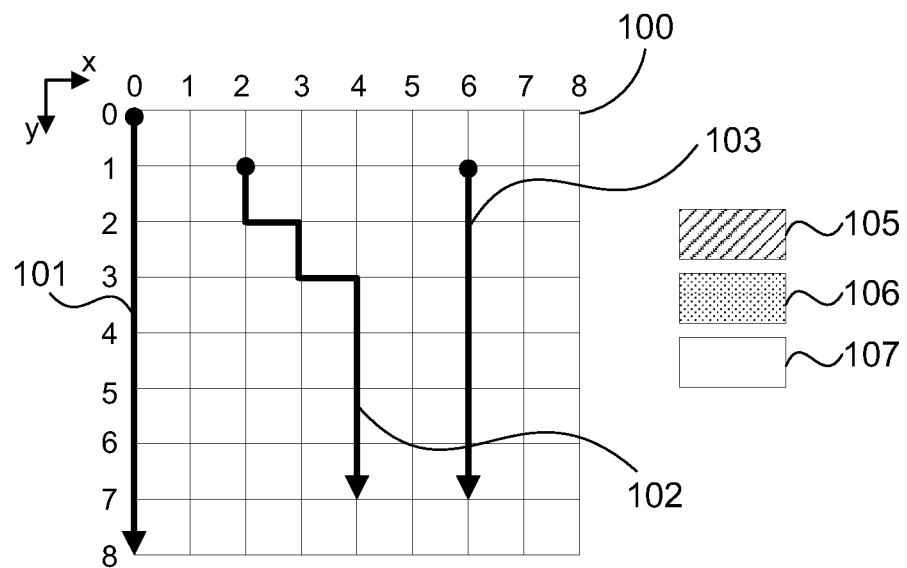
FIG. 1A shows an example of an edge-based representation of a page.

FIG. 1A shows an edge-based representation for an example page 100. Page 100 is shown as a grid of pixels, where the x and y co-ordinate values are increasing in the right and downwards directions respectively, forming eight horizontally arranged scan lines. The edge-based representation contains non-intersecting edges 101, 102 and 103. Each edge is encoded as a set of a starting and ending Y value, and a set of X values (or X value offsets), one for each Y value between the starting and ending Y value, inclusive. These X and Y values denote the top-left corners of pixels adjacent to the edge. For example, edge 102 contains starting and ending Y values 1 and 6 respectively, and X values of 2, 3, 4, 4, 4, and 4. The starting and ending values relate to the top-left corner of a pixel (discussed later with respect to FIG. 2). In this example, each edge also contains a reference to a single flat colour fill. In FIG. 1A, edges 101, 102 and 103 refer to fills 105, 106 and 107 respectively which also form part of the edge-based representation of the page 100.

While the edge-based representation discussed above resolves overlapping objects, some information about the non-overlapping regions is lost due to the compact nature of the edge-based intermediate representation, as required for RIP module 614 to operate with high performance. For example, not only is the right boundary lost in the intermediate edge-based representation, but also horizontal connections are not present in the edge-based representations, as demonstrated by FIG. 1A. This form of compactness makes it even more challenging to establish a full boundary of a non-overlapping region. The edge-based representation 620 is used by the Region Extractor module 613 to produce non-overlapping graphical objects. The process of Region Extractor module 613 will be described in a later section. These non-overlapping objects are passed into the Raster Image Processor (RIP) module 614. In some implementations, the RIP module 614 is a module with limited support for handling overlapping graphical objects in the object-based representation 622. In alternative implementations, RIP module 614 may have support for overlapping objects, but performs more efficiently when processing non-overlapping object-based intermediate representations 622. Because all overlapping graphical objects are resolved by system 601 by first creating an edge-based representation 620, and then converting the edge-based representation 620 into a non-overlapping object-based representation 622, the RIP module 614 can then easily and correctly rasterise the objects into an image, and pass the image to Printer Engine 615, which produces the printed output.

Figure 7:
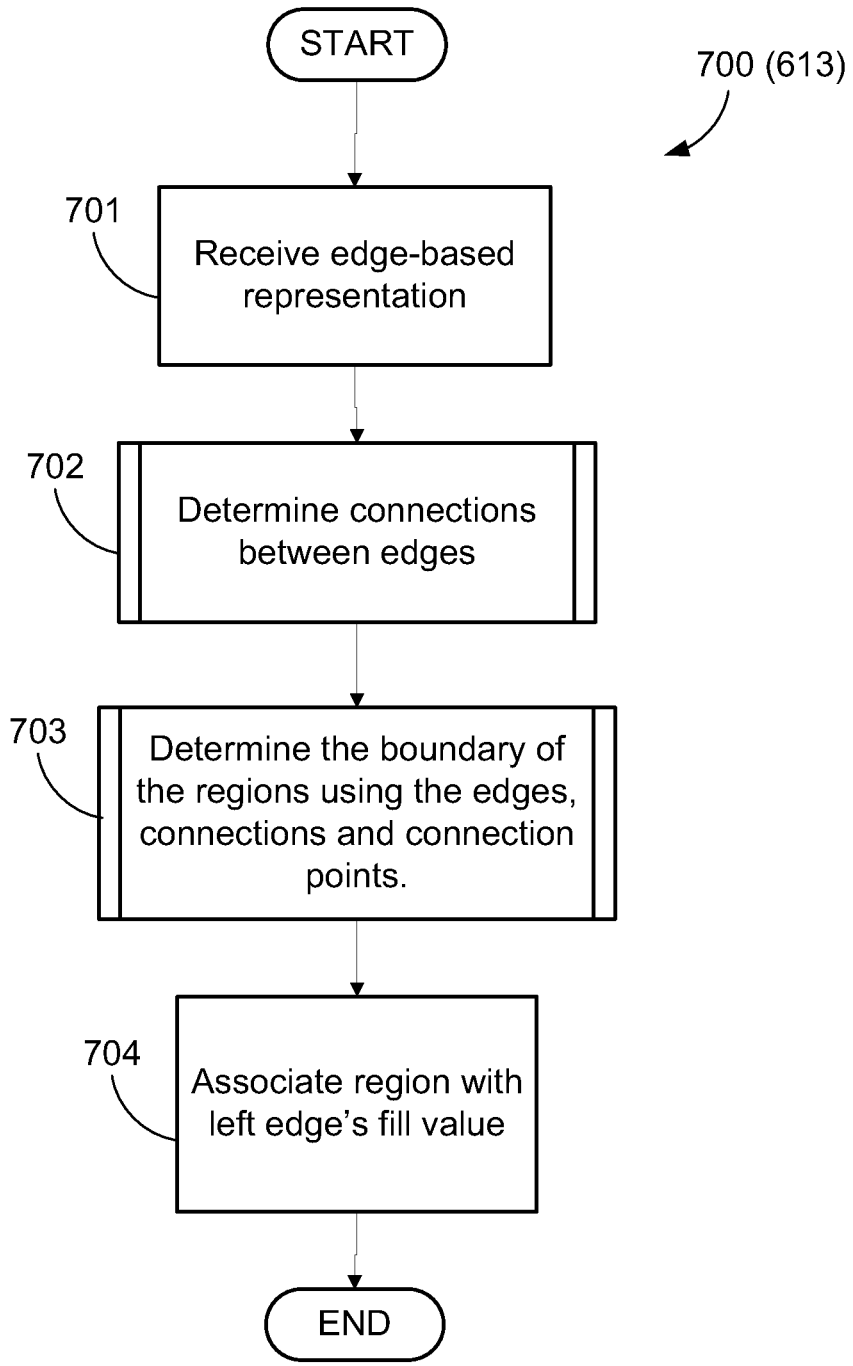
FIG. 7 is a schematic flow diagram illustrating a method of determining regions from an edge-based representation of a page.

The process used in Region Extractor module 613 for converting the edge-based representation 620 into the object-based representation 622 will now be described with reference to the flowchart of FIG. 7. Process 700 starts at step 701 where the region extractor module 613 receives the edge-based representation 620 representing a page. This data can, for example, be received from Interpreter Module 612. An example of the edge-based representation for page 100 is shown in FIG. 1A, comprising edges 101, 102 and 103 and associated region fills 105, 106 and 107. At step 702, the connections between the edges are determined. These connections are used in step 703 to form a graph and, by traversing through the graph for each edge, the boundary of each region associated with an edge are determined by step 703. Finally, at step 704, the fill of the region is set to the fill associated with the edge which makes up the left side of the boundary. In the example of FIG. 1A, edges 101, 102 and 103 are the left edges of regions 111, 112 and 113 respectively. Thus region 111 is filled by fill 105, region 112 is filled by fill 106 and region 113 is filled by fill 107. Note that while the example shows edges with a single fill, the arrangements described herein are not limited by the number of fills. For instance, two flat fills can be combined into a single flat colour. In a more complex situation, the multiple fills can be flattened into a single image which is the visual equivalent of the multiple fills and the fill set to this image. In another arrangement, an edge having multiple fills is used to generate a region which is then assigned the same set of fills originally associated with the edge.

Figure 1B:
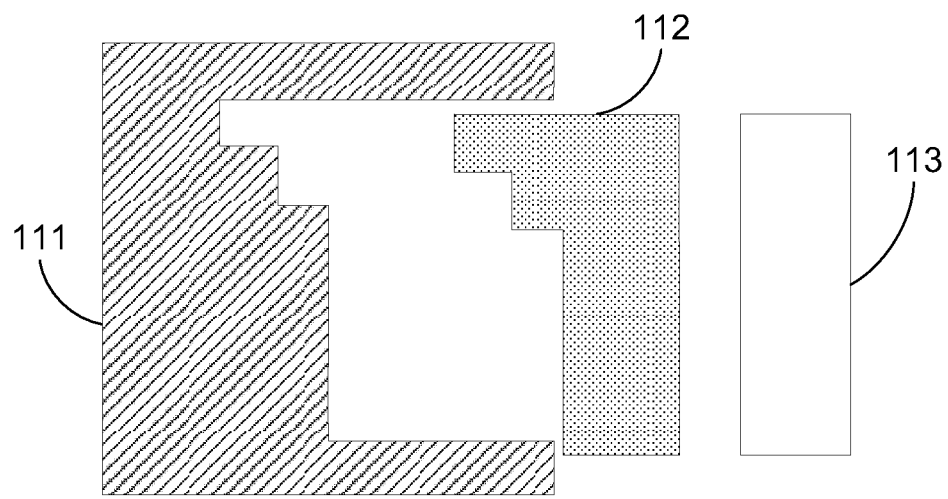
FIG. 1B shows the regions determined from the edge-based representation in FIG. 1A in a decomposed view.

FIG. 1B shows the output of process 700 performed by Region Extractor module 613 in a horizontally decomposed (exploded) view, where the regions have been extracted from the edge-based representation 100 shown in FIG. 1A. Regions 111, 112 and 113 are generated from edges 101, 102 and 103 respectively and represent non-overlapping polygons. Since the preferred edge-based representation consists of only pixel-aligned edges, the non-overlapping polygons have only right-angled corners. Other approaches may be used as desired.

Figure 17A:
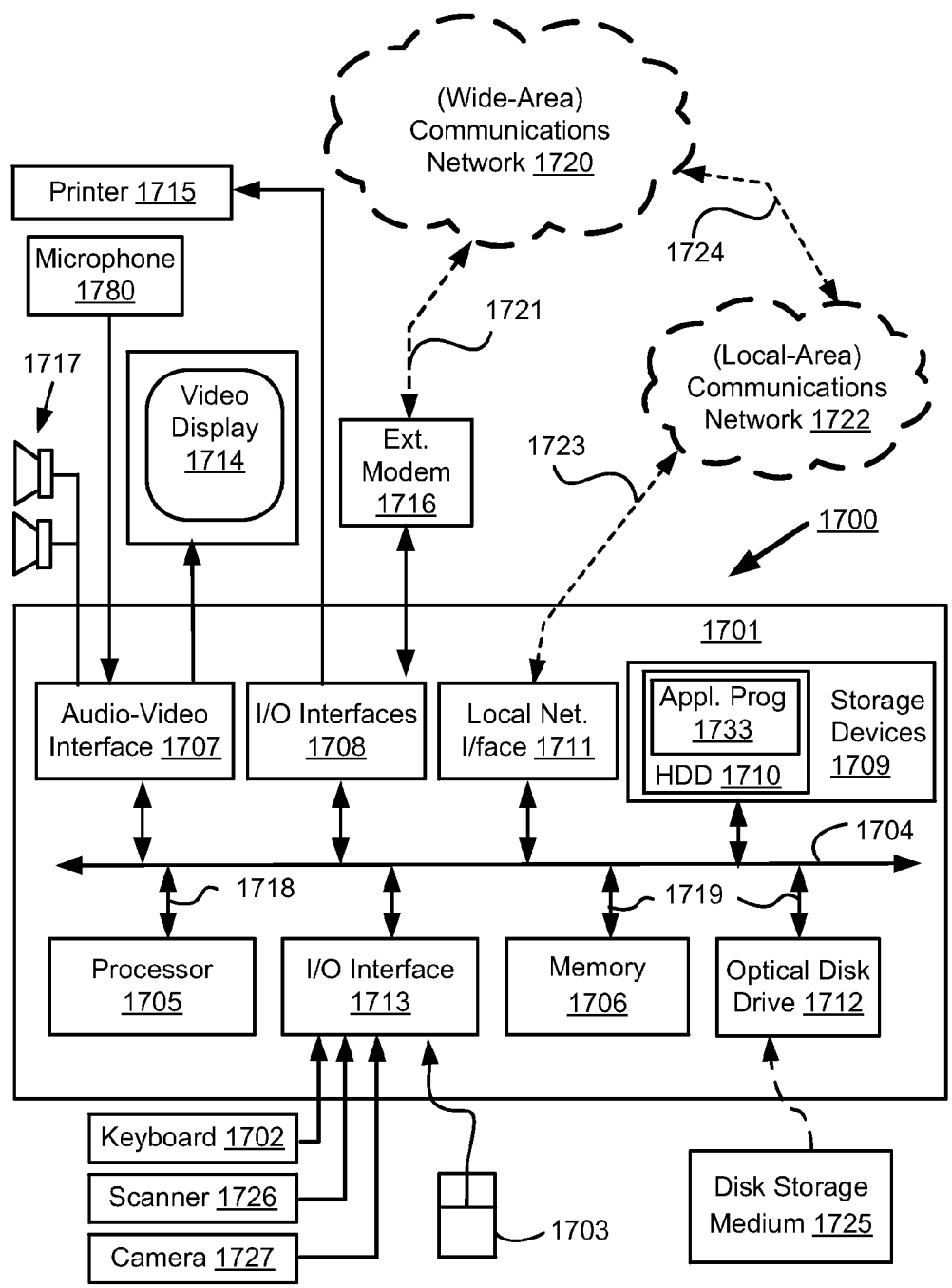
FIGS. 17A and 17B form a schematic block diagram of a general purpose computer system upon which arrangements described can be practiced.
Figure 17B:
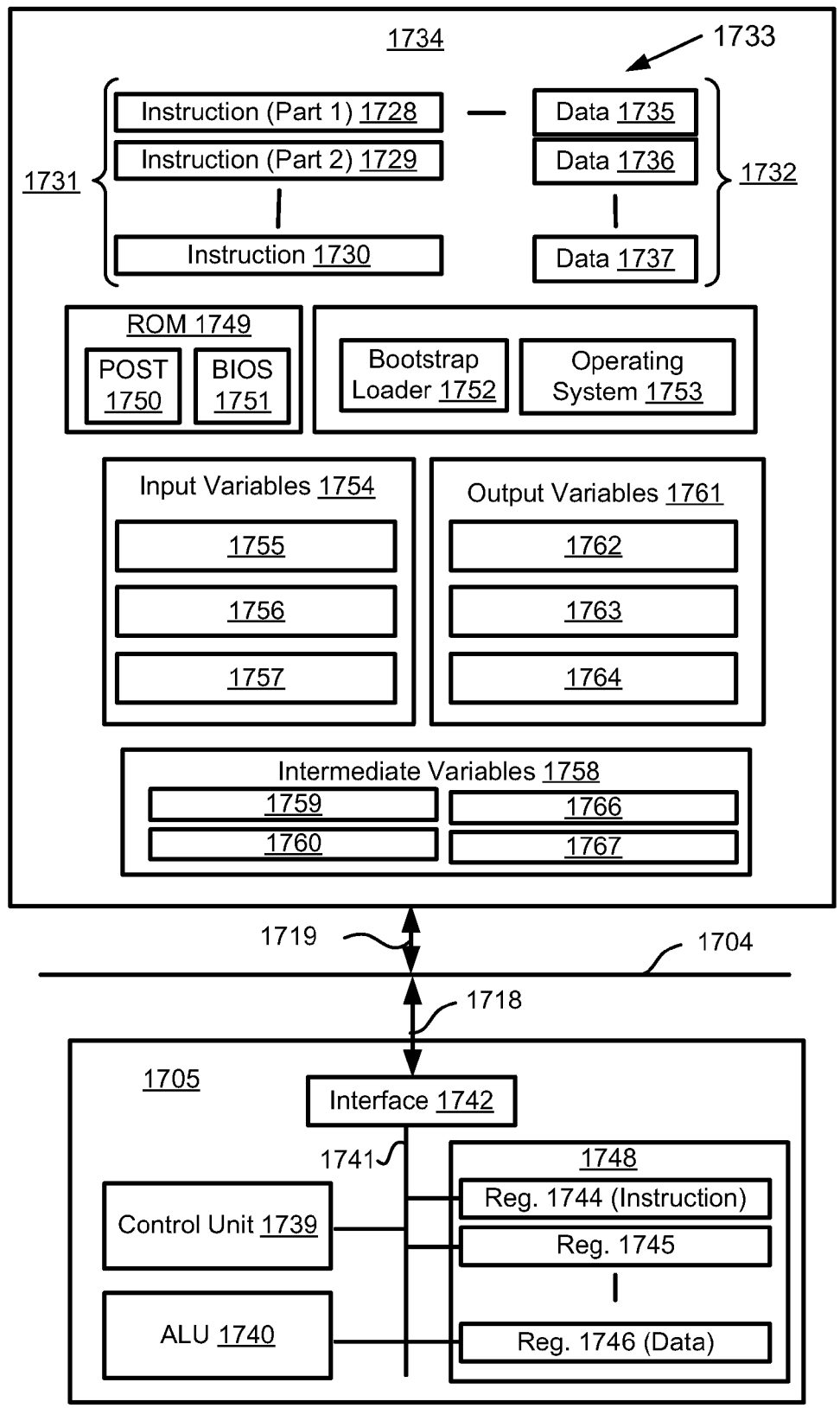

FIGS. 17A and 17B depict a general-purpose computer system 1700, upon which the various arrangements described can be practiced.

As seen in FIG. 17A, the computer system 1700 includes: a computer module 1701; input devices such as a keyboard 1702, a mouse pointer device 1703, a scanner 1726, a camera 1727, and a microphone 1780; and output devices including a printer 1715, a display device 1714 and loudspeakers 1717. An external Modulator-Demodulator (Modem) transceiver device 1716 may be used by the computer module 1701 for communicating to and from a communications network 1720 via a connection 1721. The communications network 1720 may be a wide-area network (WAN), such as the Internet, a cellular telecommunications network, or a private WAN. Where the connection 1721 is a telephone line, the modem 1716 may be a traditional "dial-up" modem. Alternatively, where the connection 1721 is a high capacity (e.g., cable) connection, the modem 1716 may be a broadband modem. A wireless modem may also be used for wireless connection to the communications network 1720.

The computer module 1701 typically includes at least one processor unit 1705, and a memory unit 1706. For example, the memory unit 1706 may have semiconductor random access memory (RAM) and semiconductor read only memory (ROM). The computer module 1701 also includes an number of input/output (I/O) interfaces including: an audio-video interface 1707 that couples to the video display 1714, loudspeakers 1717 and microphone 1780; an I/O interface 1713 that couples to the keyboard 1702, mouse 1703, scanner 1726, camera 1727 and optionally a joystick or other human interface device (not illustrated); and an interface 1708 for the external modem 1716 and printer 1715. In some implementations, the modem 1716 may be incorporated within the computer module 1701, for example within the interface 1708. The computer module 1701 also has a local network interface 1711, which permits coupling of the computer system 1700 via a connection 1723 to a local-area communications network 1722, known as a Local Area Network (LAN). As illustrated in FIG. 17A, the local communications network 1722 may also couple to the wide network 1720 via a connection 1724, which would typically include a so-called "firewall" device or device of similar functionality. The local network interface 1711 may comprise an Ethernet circuit card, a Bluetooth™ wireless arrangement or an IEEE 802.11 wireless arrangement; however, numerous other types of interfaces may be practiced for the interface 1711.

The I/O interfaces 1708 and 1713 may afford either or both of serial and parallel connectivity, the former typically being implemented according to the Universal Serial Bus (USB) standards and having corresponding USB connectors (not illustrated). Storage devices 1709 are provided and typically include a hard disk drive (HDD) 1710. Other storage devices such as a floppy disk drive and a magnetic tape drive (not illustrated) may also be used. An optical disk drive 1712 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1700.

The components 1705 to 1713 of the computer module 1701 typically communicate via an interconnected bus 1704 and in a manner that results in a conventional mode of operation of the computer system 1700 known to those in the relevant art. For example, the processor 1705 is coupled to the system bus 1704 using a connection 1718. Likewise, the memory 1706 and optical disk drive 1712 are coupled to the system bus 1704 by connections 1719. Examples of computers on which the described arrangements can be practiced include IBM-PC's and compatibles, Sun Sparcstations, Apple Mac™ or a like computer systems.

The method of graphics processing and region detection within an edge-based representation may be implemented using the computer system 1700 wherein the processes of FIGS. 6 to 16, to be described, may be implemented as one or more software application programs 1733 executable within the computer system 1700. In particular, the salient steps of graphics processing and region detection within an edge-based representation generally performed by the interpreter module 612 and the region extractor module 613 and the method 700 particularly, are effected by instructions 1731 (see FIG. 17B) in the software 1733 that are carried out within the computer system 1700. The software instructions 1731 may be formed as one or more code modules, each for performing one or more particular tasks. The software may also be divided into two separate parts, in which a first part and the corresponding code modules performs the graphics processing and region detection within an edge-based representation methods and a second part and the corresponding code modules manage any user interface between the first part and the user. The PDL 611 may be otherwise generated within the computer 1701 or supplied as an input to the computer 1701. The RIP module 614 is typically formed within the printer 1715, or within the software 1733 whose instructions 1731 are carried out on computer system 1700. The printer engine 615 is typically formed within the printer 1715.

The software may be stored in a computer readable medium, including the storage devices described below, for example. The software is loaded into the computer system 1700 from the computer readable medium, and then executed by the computer system 1700. A computer readable medium having such software or computer program recorded on the computer readable medium is a computer program product. The use of the computer program product in the computer system 1700 preferably effects an advantageous apparatus for graphics processing and region detection within an edge-based representation.

The software 1733 is typically stored in the HDD 1710 or the memory 1706. The software is loaded into the computer system 1700 from a computer readable medium, and executed by the computer system 1700. Thus, for example, the software 1733 may be stored on an optically readable disk storage medium (e.g., CD-ROM) 1725 that is read by the optical disk drive 1712. A computer readable medium having such software or computer program recorded on it is a computer program product. The use of the computer program product in the computer system 1700 preferably effects an apparatus for graphics processing and region detection within an edge-based representation.

In some instances, the application programs 1733 may be supplied to the user encoded on one or more CD-ROMs 1725 and read via the corresponding drive 1712, or alternatively may be read by the user from the networks 1720 or 1722. Still further, the software can also be loaded into the computer system 1700 from other computer readable media. Computer readable storage media refers to any non-transitory tangible storage medium that provides recorded instructions and/or data to the computer system 1700 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 1701. Examples of transitory or non-tangible computer readable transmission media that may also participate in the provision of software, application programs, instructions and/or data to the computer module 1701 include radio or infra-red transmission channels as well as a network connection to another computer or networked device, and the Internet or Intranets including e-mail transmissions and information recorded on Websites and the like.

The second part of the application programs 1733 and the corresponding code modules mentioned above may be executed to implement one or more graphical user interfaces (GUIs) to be rendered or otherwise represented upon the display 1714. Through manipulation of typically the keyboard 1702 and the mouse 1703, a user of the computer system 1700 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 1717 and user voice commands input via the microphone 1780.

FIG. 17B is a detailed schematic block diagram of the processor 1705 and a "memory" 1734. The memory 1734 represents a logical aggregation of all the memory modules (including the HDD 1709 and semiconductor memory 1706) that can be accessed by the computer module 1701 in FIG. 17A.

When the computer module 1701 is initially powered up, a power-on self-test (POST) program 1750 executes. The POST program 1750 is typically stored in a ROM 1749 of the semiconductor memory 1706 of FIG. 17A. A hardware device such as the ROM 1749 storing software is sometimes referred to as firmware. The POST program 1750 examines hardware within the computer module 1701 to ensure proper functioning and typically checks the processor 1705, the memory 1734 (1709, 1706), and a basic input-output systems software (BIOS) module 1751, also typically stored in the ROM 1749, for correct operation. Once the POST program 1750 has run successfully, the BIOS 1751 activates the hard disk drive 1710 of FIG. 17A. Activation of the hard disk drive 1710 causes a bootstrap loader program 1752 that is resident on the hard disk drive 1710 to execute via the processor 1705. This loads an operating system 1753 into the RAM memory 1706, upon which the operating system 1753 commences operation. The operating system 1753 is a system level application, executable by the processor 1705, to fulfil various high level functions, including processor management, memory management, device management, storage management, software application interface, and generic user interface.

The operating system 1753 manages the memory 1734 (1709, 1706) to ensure that each process or application running on the computer module 1701 has sufficient memory in which to execute without colliding with memory allocated to another process. Furthermore, the different types of memory available in the system 1700 of FIG. 17A must be used properly so that each process can run effectively. Accordingly, the aggregated memory 1734 is not intended to illustrate how particular segments of memory are allocated (unless otherwise stated), but rather to provide a general view of the memory accessible by the computer system 1700 and how such is used.

As shown in FIG. 17B, the processor 1705 includes a number of functional modules including a control unit 1739, an arithmetic logic unit (ALU) 1740, and a local or internal memory 1748, sometimes called a cache memory. The cache memory 1748 typically include a number of storage registers 1744-1746 in a register section. One or more internal busses 1741 functionally interconnect these functional modules. The processor 1705 typically also has one or more interfaces 1742 for communicating with external devices via the system bus 1704, using a connection 1718. The memory 1734 is coupled to the bus 1704 using a connection 1719.

The application program 1733 includes a sequence of instructions 1731 that may include conditional branch and loop instructions. The program 1733 may also include data 1732 which is used in execution of the program 1733. The instructions 1731 and the data 1732 are stored in memory locations 1728, 1729, 1730 and 1735, 1736, 1737, respectively. Depending upon the relative size of the instructions 1731 and the memory locations 1728-1730, a particular instruction may be stored in a single memory location as depicted by the instruction shown in the memory location 1730. Alternately, an instruction may be segmented into a number of parts each of which is stored in a separate memory location, as depicted by the instruction segments shown in the memory locations 1728 and 1729.

In general, the processor 1705 is given a set of instructions which are executed therein. The processor 1705 waits for a subsequent input, to which the processor 1705 reacts to by executing another set of instructions. Each input may be provided from one or more of a number of sources, including data generated by one or more of the input devices 1702, 1703, data received from an external source across one of the networks 1720, 1702, data retrieved from one of the storage devices 1706, 1709 or data retrieved from a storage medium 1725 inserted into the corresponding reader 1712, all depicted in FIG. 17A. The execution of a set of the instructions may in some cases result in output of data. Execution may also involve storing data or variables to the memory 1734.

The disclosed graphics processing and region detection within an edge-based representation arrangements use input variables 1754, which are stored in the memory 1734 in corresponding memory locations 1755, 1756, 1757. The arrangements produce output variables 1761, which are stored in the memory 1734 in corresponding memory locations 1762, 1763, 1764. Intermediate variables 1758 may be stored in memory locations 1759, 1760, 1766 and 1767.

Referring to the processor 1705 of FIG. 17B, the registers 1744, 1745, 1746, the arithmetic logic unit (ALU) 1740, and the control unit 1739 work together to perform sequences of micro-operations needed to perform "fetch, decode, and execute" cycles for every instruction in the instruction set making up the program 1733. Each fetch, decode, and execute cycle comprises:

(i) a fetch operation, which fetches or reads an instruction 1731 from a memory location 1728, 1729, 1730;

(ii) a decode operation in which the control unit 1739 determines which instruction has been fetched; and (iii) an execute operation in which the control unit 1739 and/or the ALU 1740 execute the instruction.

Thereafter, a further fetch, decode, and execute cycle for the next instruction may be executed. Similarly, a store cycle may be performed by which the control unit 1739 stores or writes a value to a memory location 1732.

Each step or sub-process in the processes of FIGS. 6 to 16 is associated with one or more segments of the program 1733 and is performed by the register section 1744, 1745, 1747, the ALU 1740, and the control unit 1739 in the processor 1705 working together to perform the fetch, decode, and execute cycles for every instruction in the instruction set for the noted segments of the program 1733.

The method of graphics processing and region detection within an edge-based representation may alternatively be implemented in dedicated hardware such as one or more integrated circuits performing the functions or sub functions to be described. Such dedicated hardware may include graphic processors, application specific integrated circuits (ASICs), field programmable gate arrays (FPGAs), digital signal processors (DSPs), or one or more microprocessors and associated memories.

First Implementation

Figure 8:
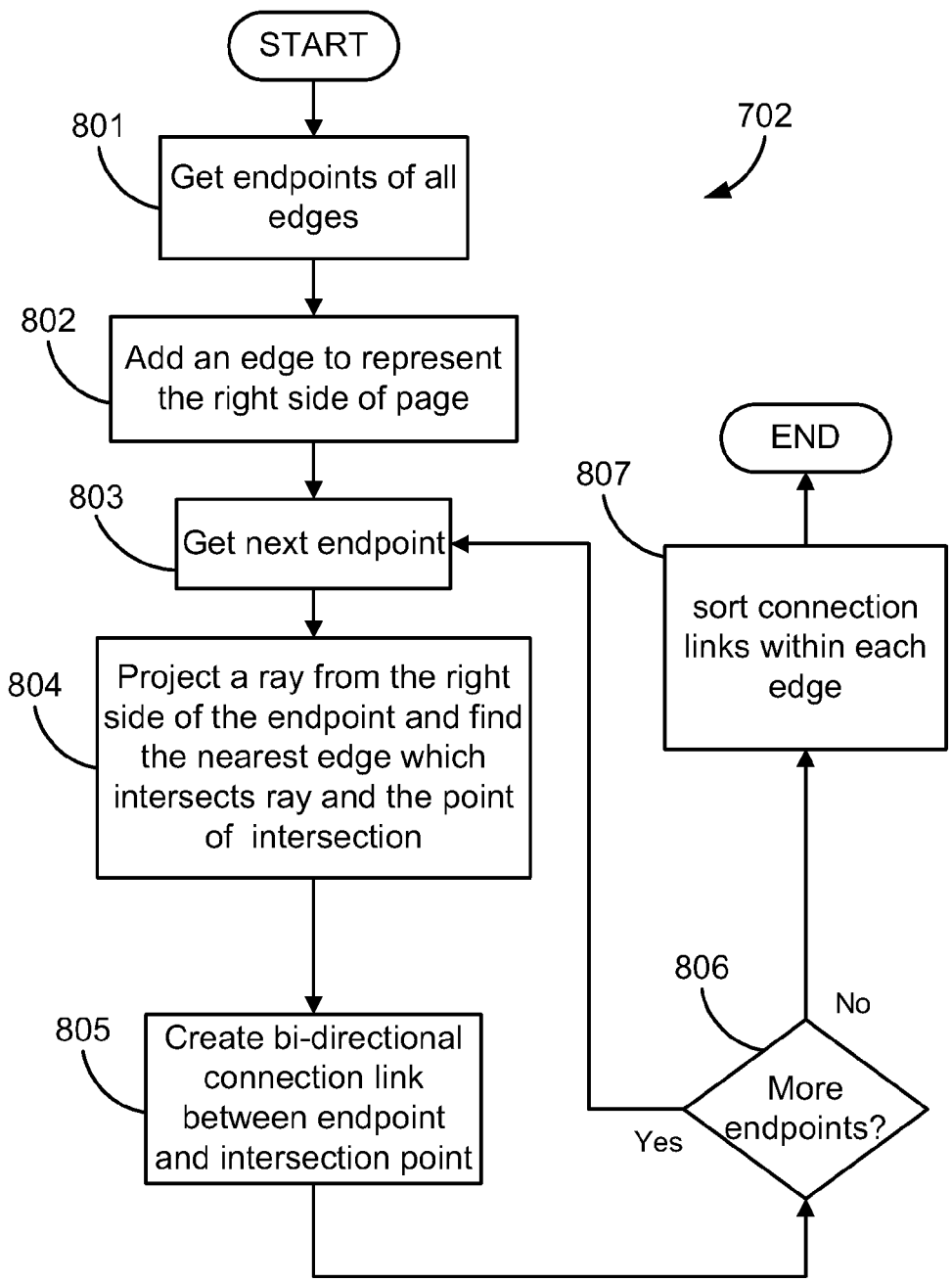
FIG. 8 is a schematic flow diagram illustrating a method of determining connection links between edges.

An example of the process 702 will now be described with reference to the flowchart of FIG. 8. The process 702 is preferably performed in software, stored in the HDD 1710 and executed by the processor 1705 in concert with the memory 1706 which temporarily stores the edge data and other associated intermediate data. The process 702 processes a set of edges within the edge-based representation 620 to create connection links. Each edge is encoded as a starting and ending Y value, and a set of X values (or X value offsets), one for each Y value between the starting and ending Y value, inclusive. Thus the top endpoint of an edge consists of the starting Y value and the first X value, and the bottom endpoint of the edge consists of the ending Y value and the last X value. As edges are aligned to the top left corner of a pixel, the actual height of an edge extends a full pixel below the bottom endpoint of the edge.

Figure 2:
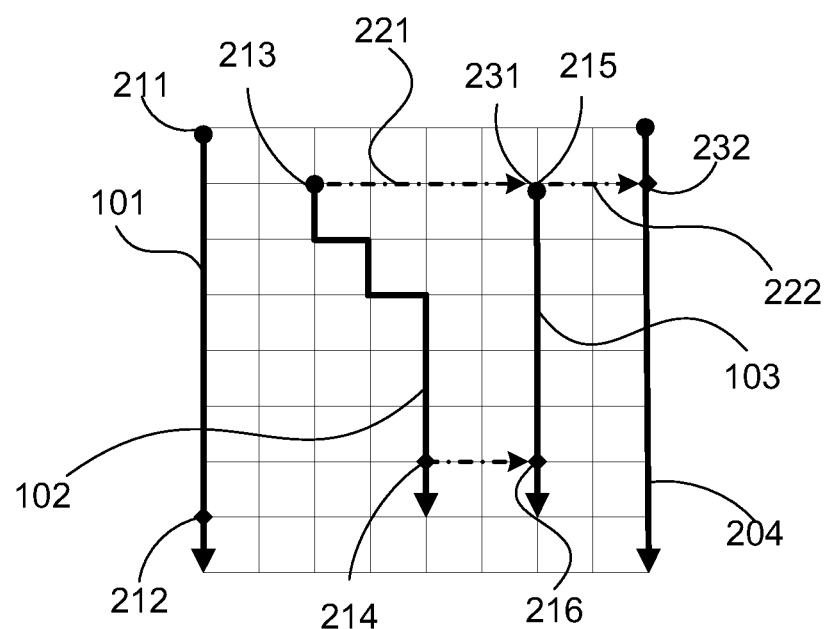
FIG. 2 shows connection links created between edges.

To illustrate this, FIG. 2 shows that the bottom endpoints for edges 101, 102 and 103 are points 212, 214 and 216. At step 801, the top and bottom endpoints of all edges retrieved or determined by the processor 1705 and are preferably stored in a list, for example formed within the memory 1706. If the two endpoints of an edge coincide, that is, an edge represents a region one pixel high, only the bottom endpoint is stored in the list. For example, if the intermediate edge-based representation data 620 comprises edges 101, 102 and 103 as shown in FIG. 1A, then the endpoints stored in the list in step 801 are points 211 to 216 as shown in FIG. 2.

Process 702 then proceeds to step 802 where an edge representing the right-hand side of the page, the rightmost edge, is inserted into the edge-based representation 620. In the example of FIG. 2, step 802 forms and inserts the right-hand side edge 204, that was implied by but not represented in the edge-based representation 620. Process 702 proceeds to step 803 where an endpoint is selected from the list. By way of example, consider the case in which endpoint 213 is selected. Process 702 then proceeds to step 804 where a ray is projected starting from the selected endpoint horizontally (along the row of pixels) and towards the right, and a nearest edge, and the intersection point where the ray intersects that edge, are determined. In the example of endpoint 213, ray 221 is projected starting from endpoint 213. The ray 221 intersects edge 103 at intersection point 231, which coincides with endpoint 215. In another example, ray 222 is projected starting from endpoint 215. Ray 222 intersects edge 204 at intersection point 232, which in this case is not an endpoint.

Process 702 then proceeds to step 805, where a connection link is created from the selected endpoint to the determined intersection point. A connection link is a directional linkage between two edges and contains references to (i) an "anchor" vertex on an edge where the connection link starts, (ii) the edge where the connection link starts, (iii) a "connecting" vertex on a "connecting" edge where the connection link ends, and (iv) the "connecting" edge where the connection link ends. For example, for the selected endpoint 213 the directional linkage 221 from the endpoint 213 and the determined intersection point 231 contains (i) an "anchor" vertex 213, (ii) the edge 102 where the connection link 221 starts, (iii) the intersection point 231, and (iv) the connecting edge 103. The data for each vertex stores the x and y coordinates of the vertex as well as a record to indicate if the vertex is located at the bottom endpoint of an edge. A complementary connection link is also created from the determined intersection point 231 to the selected endpoint 213, i.e., the anchor vertex of one connection link is the connecting vertex of the complementary connection link and vice versa.

Once the anchor and connecting vertices are determined by the processor 1705, the two connection links are stored in the memory 1706, each associated with the edge from which they originate. In the example of endpoint 213, a first connection link corresponding to the ray 221 is created starting from selected endpoint 213 on edge 102 and ending at intersection point 231 on edge 103. As this example is illustrated in the table 300 of FIG. 3A and graphically in FIG. 3B, this connection link is stored in edge 102 as a connection link 343 shown in the table 300 of FIG. 3A, where endpoint 213 and intersection point 231 are stored as "anchor" vertex 313 and "connecting" vertex 315 respectively. The records in both vertices 313 and 315 are set to indicate that they are not located at the bottom endpoints of an edge. The connection link 343 is also represented graphically in FIG. 3B. Continuing the example, a complementary connection link 345 is created starting from intersection point 215 on edge 103 and ending at selected endpoint 213 on edge 102. This connection link is stored in edge 103, as shown by row 345 of table 300. Data representing the table 300 may be temporally stored in the memory 1706.

Figures 3A, 3B:
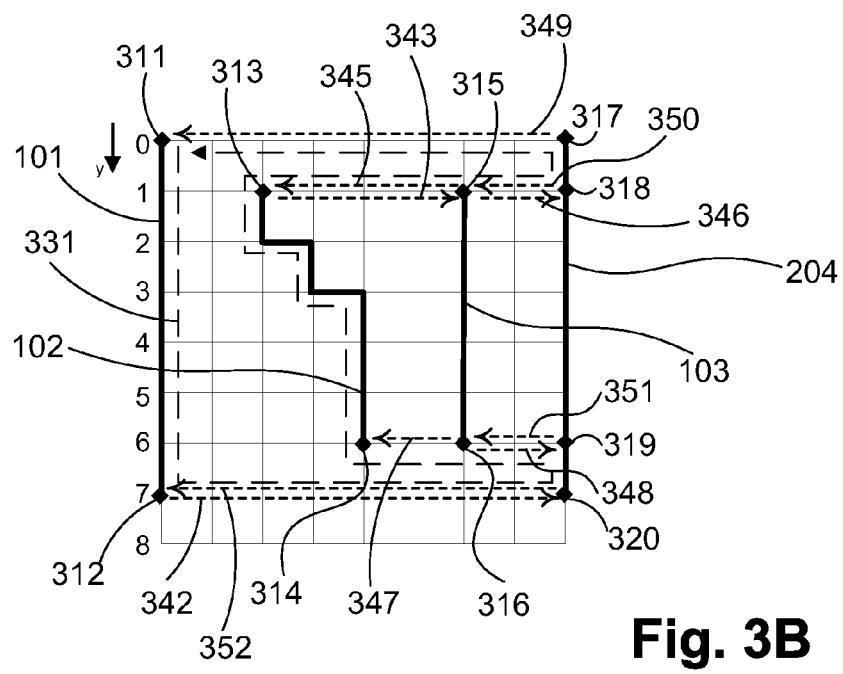
FIG. 3A shows the connection links between all edges in a table representation.
FIG. 3B shows the connection links between all edges as a diagram.

Process 702 then proceeds to step 806 where the processor 1705 determines if there are more endpoints in the list which have not been processed. If there are more endpoints, process 702 returns to step 803 and repeats the process from step 803 onwards using another endpoint. If it is determined that there are no more endpoints in the list, meaning that all connection links have been determined and stored in the appropriate edges, process 702 proceeds to step 807. To make finding a connection link in an edge more efficient, the connection links within each edge are sorted according to their "anchor" vertex's y co-ordinate value. Table 300 of FIG. 3A shows the sorted connection links for all edges after finishing step 807, which refers to edges 101 to 204 and vertices 311 to 320.

Figure 9:
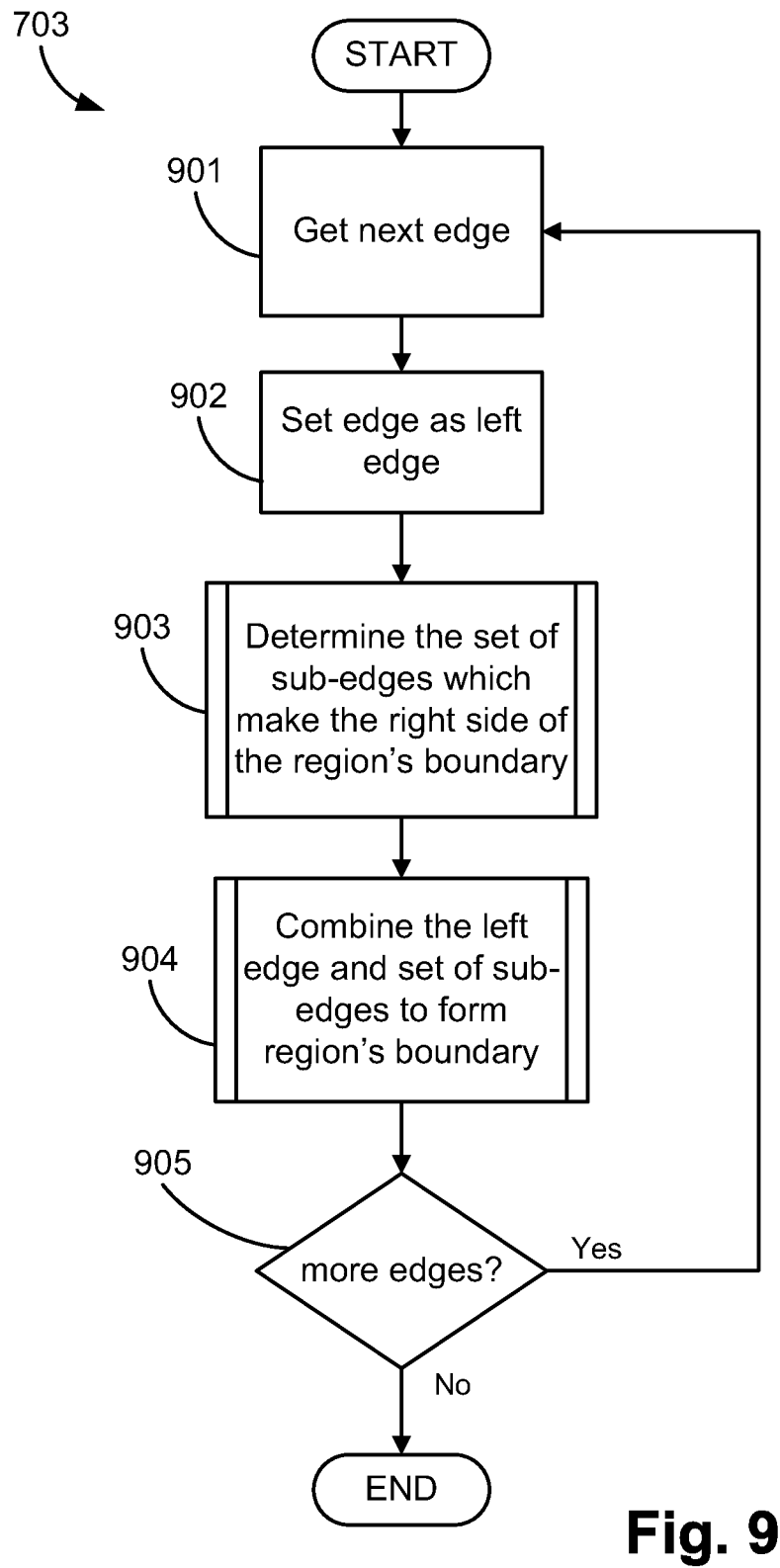
FIG. 9 is a schematic flow diagram illustrating a method of determining the boundary of all regions.

An example of the process 703 will now be described with reference to the flowchart of FIG. 9. Process 703 determines the boundaries of the regions as represented by edges in the edge-based representation 620 by forming a graph using the edges and connection data, and traversing through the graph in an anti-clockwise manner. As each edge represents a region in the edge-based representation, iterating through all of these edges guarantees that all regions are detected. The process 703 starts off with the set of edge and connection data obtained after process 702. An example of the input data is the set of edge and connections link data 300 in the table of FIG. 3A, obtained using the process shown in FIG. 8, and depicted graphically in FIG. 3B. Process 703 starts at step 901, where an edge is selected, excluding the rightmost edge. By way of example, consider the case in which edge 101 is selected. Process 703 then proceeds to step 902 where the selected edge is set as the left side of the boundary of the region corresponding to the selected edge in the edge-based representation 620. This edge shall be referred to as the left edge.

Process 703 then proceeds to invoke process 903, where a set of sub-edges that forms the right side of the boundary is determined. Process 903 is described in detail later, with reference to FIG. 10. FIG. 4A shows the sub-edges 402, 403 and 404 obtained for the right side of the region corresponding to edge 101 after process 903 processes the connection data 300 for edge 101. Process 703 then proceeds to invoke process 904 where the current left edge is combined with the set of sub-edges to form the complete boundary of a region which includes the selected edge as its left edge. FIG. 4C shows an example of the boundary 431 for the polygonal region including edge 101 as its left edge after process 904 combines the sub-edges 402, 403, 404 and the associated left edge 101. Process 904 is described in detail later, with reference to FIG. 12.

Process 703 then proceeds to step 905 where the processor 1705 determines if there are more edges which have not been processed, ignoring the rightmost edge. If there are more edges, process 703 returns to step 901, and repeats using another edge. If there are no more edges, the boundary of all regions has been determined and process 703 terminates.

One method of determining the set of sub-edges of a right edge corresponding to a given left edge is by travelling through sub-sections of the edges via the connection links in order to form a closed path. These sub-sections are the sub-edges which form the right side of the boundary. For example, dashed path 331 in FIG. 3B represents a closed path travelling in an anti-clockwise direction for the region corresponding to edge 101. Process 903 describes one implementation of this method. To illustrate the process, edge 101 will be used as an example while describing process 903.

Figure 10:
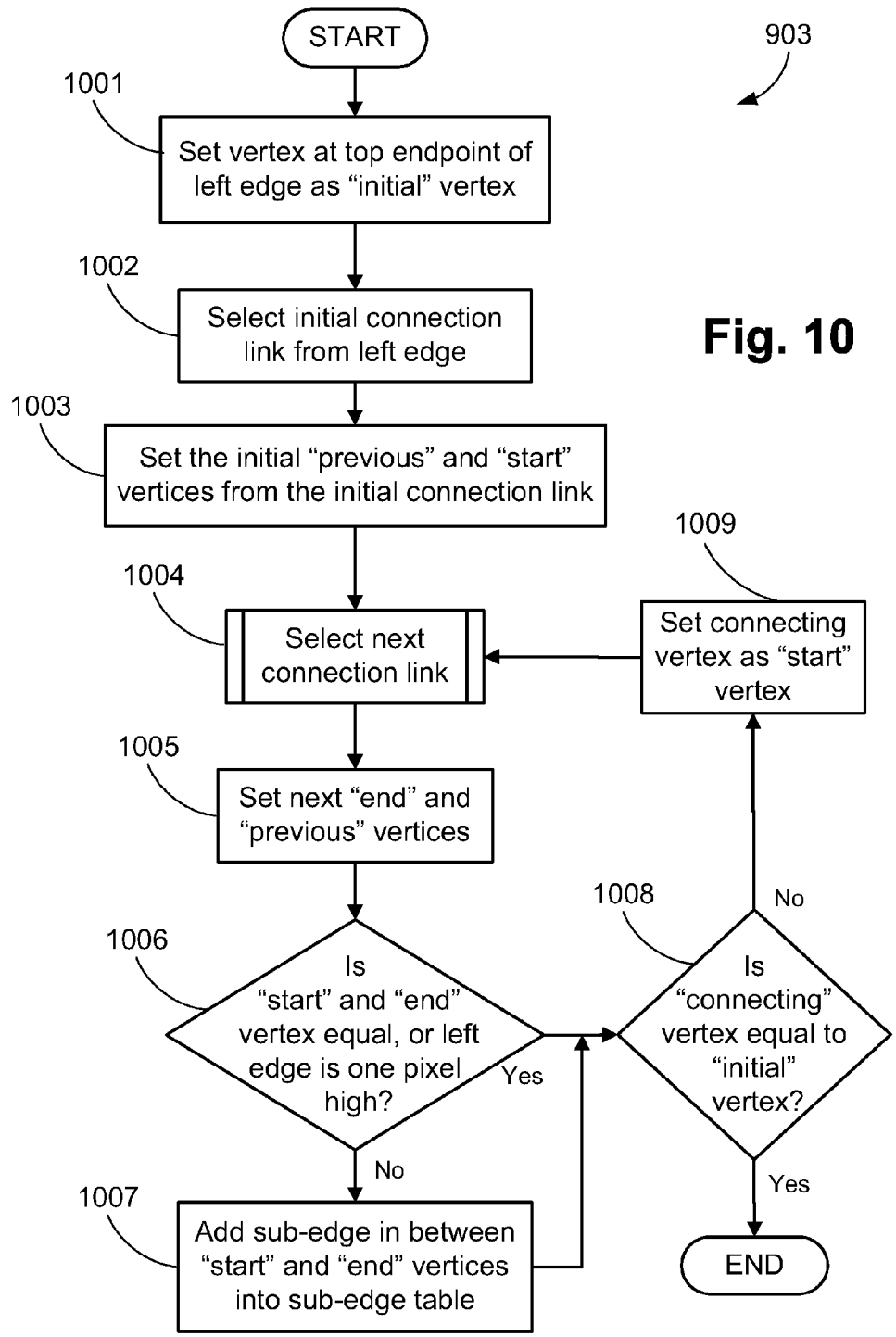
FIG. 10 is a schematic flow diagram illustrating a method of determining the set of sub-edges which forms the right-hand side of a region's boundary.

Process 903 will now be described with reference to the flowchart of FIG. 10. As was previously described, a preferred edge-based representation of a page contains only left edges of implicit regions. Right edges are provided only indirectly, in that parts of neighbouring left edges of other implicit region form the right boundaries of a given region. For a given left edge, the process 903 adds portions ("sub-edges") of neighbouring edges to a sub-edge table. These portions are subsequently used by the process 904 to determine the actual boundary of the implicit region associated with the edge.

Process 903 begins with the left edge of the region to be determined by process 903. The process 903 starts at step 1001 where the value of the "initial" vertex is initialised to the top endpoint of the left edge. Step 1001 records the "initial" vertex so that process 903 will terminate correctly when the full boundary has been completed. In the example, the "initial" vertex for edge 101 is vertex 311. Process 903 then proceeds to step 1002 where the initial connection link is selected. The initial connection link is the one with an "anchor" vertex corresponding to the bottom endpoint of the left edge and has a "connecting" vertex which lies to the right of the bottom endpoint. In the example, the initial connection link selected is connection link 342 between the bottom endpoint 312 of the edge 101 and an intersection point 320 with the next encountered edge 204.

Process 903 then proceeds to step 1003 where the values of the "previous" and "start" vertices are initialised to the "anchor" vertex and "connecting" vertex from the initial connection link respectively. The "start" vertex represents the vertex at the bottom endpoint of the next potential sub-edge to consider as part of the boundary, whereas the "previous" vertex represents the last vertex touched on the most recently visited edge. In the example, the "previous" vertex is initialised to vertex 312 as it represents the last vertex touched on the most recently visited edge 101, and the "start" vertex is initialised to vertex 320 as it represents the bottom endpoint of the next potential sub-edge. If the bottom-most pixel of edge 204 was on a different scan line to connection link 342, the endpoint is still selected (not the intersection point). Process 903 then proceeds to invoke process 1004, where the next connection link to consider when forming the boundary of an edge is selected. Process 1004 is described in detail later with reference to FIG. 11. In the example, process 1004 returns the connection link 351 as the next connection link to consider. The connection link 351 contains "anchor" vertex 319 and "connecting" vertex 316.

Process 903 then proceeds to step 1005 where the value of the "end" vertex is set to the "anchor" vertex of the connection link which was selected by process 1004. The "end" vertex represents the vertex at the top endpoint of the potential sub-edge and is used in conjunction with the "start" vertex set in step 1003 to mark the start and end of a potential sub-edge. Step 1005 also updates the value of the "previous" vertex to the "anchor" vertex, since the "anchor" vertex is now the last vertex touched on the most recently visited edge. In the example, "anchor" vertex 319 forms the top endpoint of the potential sub-edge, and is also the last vertex touched on the most recently visited edge, and so the "end" vertex and the "previous" vertex are both set to the value of the "anchor" vertex 319.

Process 903 then proceeds to step 1006, where it is determined if the "start" and "end" vertices are equal. If the vertices are not equal ("NO" case of step 1006), the portion of the edge between them forms part of the boundary under creation and process 903 proceeds to step 1007 where the sub-edge is inserted into a sub-edge table before proceeding to step 1008. Either the "start" or the "end" vertex can form a split point by which splitting of the current edge into sub-edges is performed. A split point is formed, and sub-edges are obtained, if the "start" vertex or the "end" vertex is not at an endpoint of an edge. The sub-edge table stores sub-edges to be used in the construction of the boundary. Additionally, if the vertices are equal but the endpoints of the left edge coincide (i.e. it is an edge of height one pixel), then step 1006 also proceeds to step 1007 to insert an entry into the sub-edge table. If the vertices are equal, and the left edge is more than one pixel high ("YES" case of step 1006), then the edge does not contribute to the boundary and process 903 jumps straight to step 1008.

An example of process 903 taking the "NO" path at step 1006 is when "start" and "end" vertices are determined to be vertices 320 and 319 at the start of step 1006, with the vertex 319 being the split point for splitting the edge 204. Sub-edge 404 is therefore formed between the pair of vertices 320 and 319, as shown in FIG. 4A as a result of splitting the edge 204. Sub-edge 404 together with vertex pair 320 and 319 are inserted into the first entry 421e of the sub-edge table 420 shown in FIG. 4B. Notably the splitting of the edge 204 occurs as a result of the split point 319 and an endpoint 316 of the adjacent edge 103 identified via the connection link 351. Process 903 then continues at step 1008. Note that a sub-edge can also be formed between one split point and another split point.

An example of process 903 taking the "YES" path of step 1006 is when process 903 begins with "start" vertex 316 (FIG. 3B), and connection link 347 is selected at process 1004. At step 1005, "end" vertex is set to "anchor" vertex 316 which coincides with the "start" vertex. As the "start" and "end" vertex are determined to be equal at step 1006, process 903 proceeds to step 1008 immediately.

In step 1008, the processor 1705 determines if the "connecting" vertex is equal to the "initial" vertex. If the vertices are not equal ("NO" case of step 1008), then process 903 continues to traverse through the edges and proceeds to step 1009 where the "connecting" vertex is set as the next "start" vertex before returning to step 1004. Otherwise if the "connecting" vertex is equal to the "initial" vertex ("YES" case of step 1008), then all sub-edges needed to form the boundary have been determined. Process 903 then terminates.

An example of process 903 taking the "NO" path at step 1008 is when "initial" vertex is set to 311 and "connecting" vertex is set to 316 at the start of step 1008. As the two vertices are not equal, process 903 proceeds to step 1009 where "connecting" vertex 316 is set as the next "start" vertex. Process 903 returns to step 1004. An example of process 903 taking the "YES" path at step 1008 occurs after process 903 continues to loop through from process 1004 to step 1009, adding sub-edges 402 and 403 into the sub-edge table during the loop. After adding sub-edge 403 at step 1007, process proceeds to compare the "connecting" vertex 311 with the "initial" vertex 311. As both vertices are equal, the loop is complete and a set of sub-edges that forms the right side of the boundary has been determined. The process 903 terminates.

The process 903 operates to associate vertices from the plurality of vertices determined in step 702 with at least one edge (e.g. 101) from the intermediate graphical edge-based representation 620 using endpoints of the edge 101. This involves selecting, from the determined plurality of vertices, a plurality of neighbouring vertices (e.g. 320,319,314,313, 318,317) to the edge 101 to define (according to step 904) a region (e.g. 431) with the endpoints of the edge 101. In FIG. 4A, it is observed that vertices 423, 422 are not vertices from the determined plurality of vertices, since the vertices 423 and 422 originate from a down-shift of 1 pixel from vertices 320 and 314, which is necessary due to using preferred pixel-aligned edges comprising top-left co-ordinates only.

Figure 11:
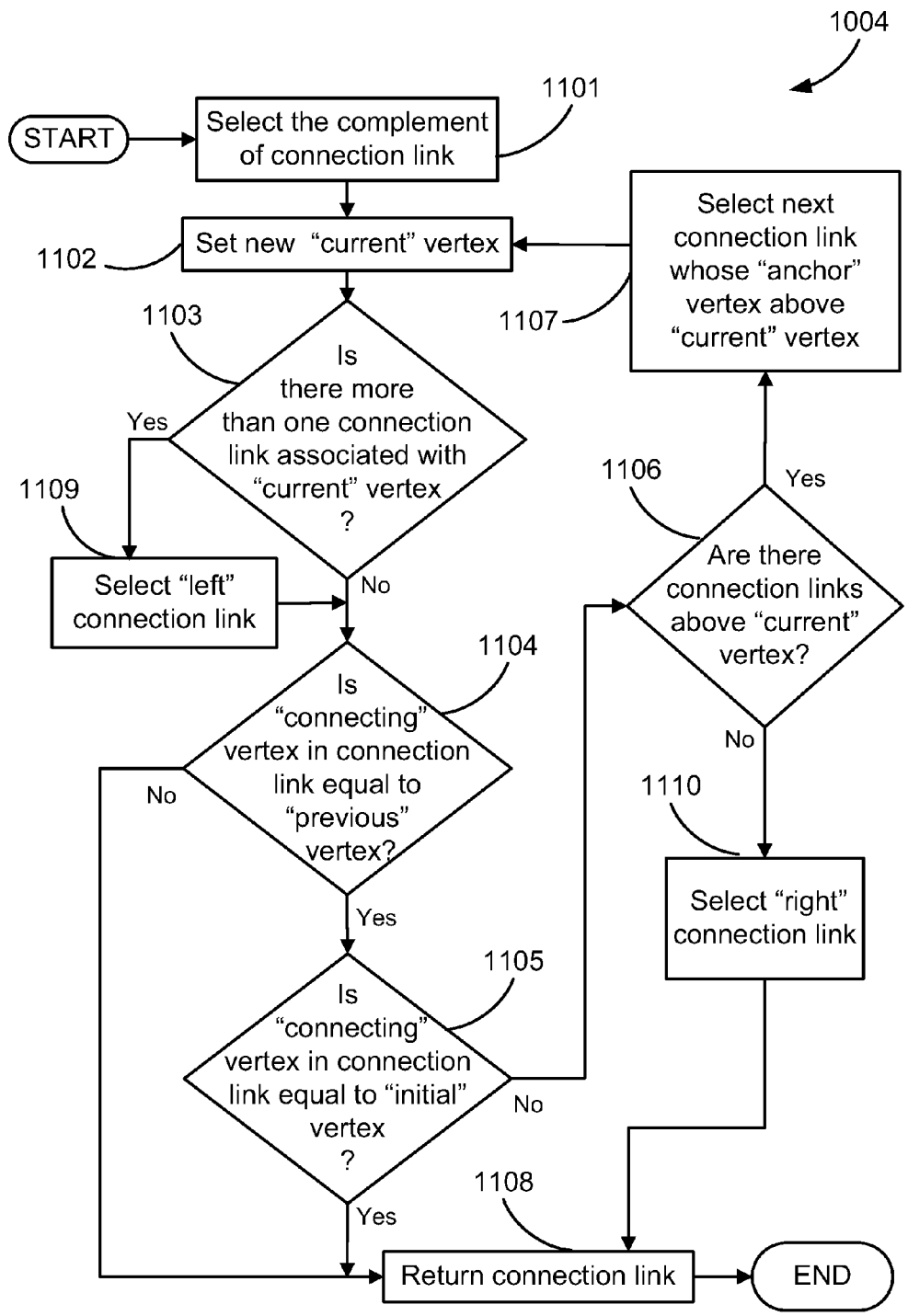
FIG. 11 is a schematic flow diagram illustrating a method of determining the next connection link to follow.

The process 1004 for selecting the next connection link as invoked by process 903 will now be described with reference to the flowchart of FIG. 11. Process 1004 is initialised with the received connection link, the "previous" vertex and the "initial" vertex determined by parent process 903. Process 1004 operates on a single edge, namely the "connecting" edge stored in the received connection link. Process 1004 begins at step 1101 by determining the point on the edge where the current connection link joins the edge. To do this, step 1101 selects the complement of the received connection link. A pair of complementary connection links is defined as two connection links that refer to the same set of vertices and edges but with the references swapped. The complementary connection link is found within the connection links stored in the "connecting" edge of the received connection link and originates from the vertex equal to the "connecting" vertex.

Process 1004 then proceeds to step 1102, where the value of the "current" vertex is set to the value of the "anchor" vertex of the complementary connection link. The "current" vertex is the vertex currently being considered as a candidate for the start of the next connection link. Process 1004 then proceeds to step 1103 where the processor 1705 determines whether the "current" vertex has more than one connection link originating from it. Each "anchor" vertex can spawn at most two connection links, one to the left of the "anchor" vertex, and one to the right. If the edge has only one connection link originating from the "current" vertex, then step 1103 proceeds to step 1104. Otherwise process 1004 proceeds to step 1109 where the connection link to the left of the "current" vertex, i.e., the "left" connection link, is selected before proceeding to step 1104. The "left" connection link is given priority over the "right" connection link to ensure that process 1004 will find sub-edges closest to the left edge first.

At step 1104, the "connecting" vertex of the selected connection link is compared by the processor 1705 with the "previous" vertex to determine if the connection link leads to an edge which has already been visited or not. If the "connecting" vertex is not equal to the "previous" vertex, then the connection link will lead to an unvisited edge, thus process 1004 proceeds to step 1108, where the selected connection link is returned before process 1004 is terminated. However, if the "connecting" vertex is equal to the "previous" vertex, this indicates that the connection link will lead to a visited edge, thus process 1004 proceeds to step 1105, where the processor 1705 determines if the "connection" vertex in selected connection link is equal to the "initial" vertex. If true, this indicates that the boundary is complete, thus process 1004 proceeds to step 1108 where the connection link is returned. Otherwise, process 1004 proceeds to step 1106 where it is determined if there is one or more connection links whose "anchor" vertex is above the "current" vertex within the edge containing the "current" vertex. If there are no "anchor" vertices above "current" vertex, process 1004 proceeds to step 1110, where the connection link to the right of "current" vertex is selected, i.e., the "right" connection link. Process 1004 proceeds to step 1108, where the selected connection link is returned.

The "right" connection link is guaranteed to exist at step 1110 due to the way the connection links are constructed. The only vertex which does not have a "right" connection link originating from it and yet does not have connection links above it is the vertex at the top endpoint of the right most edge, for example vertex 317 in edge 204 in FIG. 3B. However this vertex must also be connected to the vertex at the top endpoint of the left edge which completes the boundary, for example vertex 311 in edge 101, hence process 1004 would have proceed to the "YES" case of step 1105 before reaching step 1110.

If is determined that there are "anchor" vertices above "current" vertex at step 1106, process 1004 proceeds to step 1107, where the connection link with an "anchor" vertex that has the next smallest y value after "current" vertex within the edge is selected by the processor 1705 and the process is repeated again by returning to step 1102 and updating the value of the "current" vertex to be equal to the value of the new "anchor" vertex. Effectively process 1004 is travelling up the edge and looking for a connection link which will lead to the next edge while avoiding any edge previously visited.

An example of the initial run of process 1004 for edge 101 is simple and need not be described. Process 1004 proceeding after initially receiving "initial" vertex 311, "previous" vertex 312 and connection link 342 (which contains a reference to "connecting" edge 204) will now be described. At step 1101, process 1004 searches through the connection links 349, 350, 351 and 352 in edge 204 (FIG. 3A), and determines that connection link 352 refers to the edge 101 of "previous" vertex 312 and also the same pair of vertices 320, 312 as connection link 342, but with the references swapped. Thus, the processor 1705 determines that connection link 352 is the complement of connection link 342. At step 1102, "anchor" vertex 320 in complement connection link 352 is set as the "current" vertex for edge 204. At step 1103, it is determined that only connection link 352 originates from "current" vertex 320 in edge 204, thus connection link 352 is selected and process 1004 proceeds to step 1104, where it is determined that "connecting" vertex 312 in connection link 352 is equal to "previous" vertex, and process 1004 proceeds to step 1105. At step 1105, it is determined that "connecting" vertex 312 is not equal to "initial" vertex 311, thus process 1004 proceeds to step 1106. At step 1106, it is determined that the "anchor" vertex of connection links 349, 350 and 351 in edge 204 are above "current" vertex 320, hence process 1004 proceeds to step 1107. At step 1107, connection link 351 whose "anchor" vertex 319 is selected as it has the next smallest y value after the "current" vertex 320 as shown in Table 300 of FIG. 3A. Process 1004 then returns to step 1102, where the "current" vertex is updated to be equal to "anchor" vertex 319. Process 1004 then proceeds to step 1103 and once again only one connection link originates from "current" vertex 319, thus process 1004 proceeds to step 1104. This time however, it is determined that "connecting" vertex 316 for connection link 351 is not equal to "previous" vertex 312, thus process 1004 proceeds to step 1108 where connection link 351 is return and process 1004 terminates.

An example of process 1004 selecting "left" connection link at step 1109 ('YES' case for step 1103) will now be described. Process 1004 initially receives "initial" vertex 311", "previous" vertex 313 and connection link 343 (which contains a reference to "connecting" edge 103). At steps 1101 and 1102, complementary connection link 345 is selected and the value of the "current" vertex is set to be equal to "anchor"

vertex 315. Two connection links 345 and 346 originate from "current" vertex 315, hence process 1004 proceeds to step 1109 from step 1103, where "left" connection link 345 is selected before proceeding to step 1104.

An example of process 1004 selecting the "right" connection link at step 1110 will now be described. Continuing on from step 1104 in the previous example, "connecting" vertex 313 is equal to the "previous" vertex and is also not equal to "initial" vertex 311, hence process 1004 proceeds to step 1106 after stepping through steps 1104 and 1105. At step 1106, it is determined that there are no connection links with "anchor" vertex above "current" vertex 315 in edge 103. Hence process 1004 proceeds to step 1110, where connection link 346 is selected and process 1004 returns it at step 1108.

An example of when "connecting" vertex is determined to be equal to "initial" vertex at step 1105 ('YES' case for step 1105) will now be described. Process 1004 initially receives "initial" vertex 311", "previous" vertex 315 and connection link 346 (which contains a reference to "connecting" edge 204). At step 1101 and 1102, complementary connection link 350 is selected and "anchor" vertex 318 is set as "current" vertex. Only connection link 350 originates from "current" vertex 318, thus process 1004 proceeds from step 1103 to step 1104. "Connecting" vertex 315 of connection link 350 is equal to "previous" vertex but not equal to "initial" vertex 311, hence process 1004 proceeds to step 1106 after stepping through steps 1104 and 1105. "Anchor" vertex 317 in connection link 349 is the next vertex above "current" vertex 318, hence process 1004 returns to step 1102 after stepping through steps 1106 and 1107. At step 1102, "anchor" vertex 317 in connection link 349 is used to update the value of the "current" vertex. Once again, only connection link 349 originates from "current" vertex 349, hence process 1004 selects it before proceeding to step 1104. "Connecting" vertex 311 in connection link 349 is not equal to "previous" vertex 315, however it is equal to "initial" vertex. Hence process proceeds to step 1108 after stepping through steps 1104 to 1105 where connection link 349 is returned and process 1004 terminate.

The process 904 for combining a left edge with the set of sub-edges to form a complete boundary will now be described with reference to the flowchart of FIG. 12. Process 904 joins the given left edge with each sub-edge in its associated sub-edge table, adding additional horizontal segments. Process 904 also operates to extend sub-edges downwards by one pixel in the case that the lowest point of the sub-edge is the bottom endpoint of an edge. This is necessary because the edge-based format stores only top-left pixel co-ordinates, however process 904 must generate a boundary which fully surrounds all pixels in the implicit region of the edge.

Recall that process 903 builds the sub-edge table by travelling through an edge starting from the bottom. Hence the sub-edges added to the sub-edge table are naturally sorted in the y-coordinate, where the first sub-edge is the bottom most sub-edge. For example, table 420 in FIG. 4B is the table of sub-edges associated with edge 101, where each entry contains the sub-edge along with its "start" and "end" vertices. The first entry 421e refers to sub-edge 404, which is the bottom-most sub-edge out of sub-edges 404, 402, and 403 as shown in FIG. 4A. As the edges in the edge-based representation are aligned to the top left corner of a pixel, the actual height of an edge includes the pixel from the bottom endpoint. This must be taken into account for when determining the boundary by extending each edge by one pixel downwards at the bottom vertex. For example, edge 101 and sub-edges 402 and 404 are extended one pixel downwards as shown in FIG. 4A by vertices 421, 422 and 423. Note that this applies only to vertices which correspond to the bottom endpoints of the edges and not the sub-edges. For instance, vertex 318 is an endpoint for sub-edge 403, but it is not an endpoint for edge 204, thus sub-edge 403 is not extended. Also, because of this extension of edges/sub-edges, there is a case where a sub-edge of height one pixel may be "covered" when an edge/sub-edge is extended. In such a case, the "covered" sub-edge does not form any part of the boundary of the given left edge, even though the sub-edge was provided in the sub-edge table. The process handles this case as well, as described later.

Process 904 starts at step 1201 where the "current" vertex is initialised to the bottom endpoint of the left edge. The "current" vertex denotes the vertex at which a subsequent connection is to be made, in order to continue forming the overall boundary of a region. At step 1202, the value of the "previous" vertex is initialised to the vertex at the top endpoint of the left edge. The "previous" vertex denotes the vertex from which a connection has most recently been made, in order to continue forming the overall boundary of a region. Process 904 then proceeds to step 1203 where the first sub-edge in the sub-edge table is selected (which is also the bottom-most sub-edge). Process 904 then proceeds to step 1204, where it is determined if either "current" vertex or "start" vertex of the selected sub-edge is located at the bottom endpoint of an edge. Recall that each vertex in a connection link has a record to indicate if it is located at the bottom endpoint of an edge. If both "current" vertex and "start" vertex are not located at a bottom endpoint, process 904 proceeds to step 1207. At step 1207, the "current" vertex is connected to the "start" vertex of the selected sub-edge with a horizontal line segment before proceeding to step 1208.

If it is determined that either "current" vertex or "start" vertex is located at bottom endpoint at step 1204 ('YES' case of step 1204), process 904 proceeds to step 1205 where both the "start" and "current" vertex are shifted one pixel down. Process then proceeds to step 1206, where it is determined if the "start" vertex is on the same scan line as "previous" vertex. This is to check for the case where the current sub-edge may completely "cover" the previous sub-edge. If this is not true, process 904 proceeds to step 1207. Otherwise, process 904 proceeds to step 1212, where the previous sub-edge is removed. This is achieved by replacing the last horizontal line added with a new horizontal line from the "previous" vertex to the "current" vertex, thereby bypassing the previous sub-edge. Process 904 then proceeds to step 1208.

Figure 12:
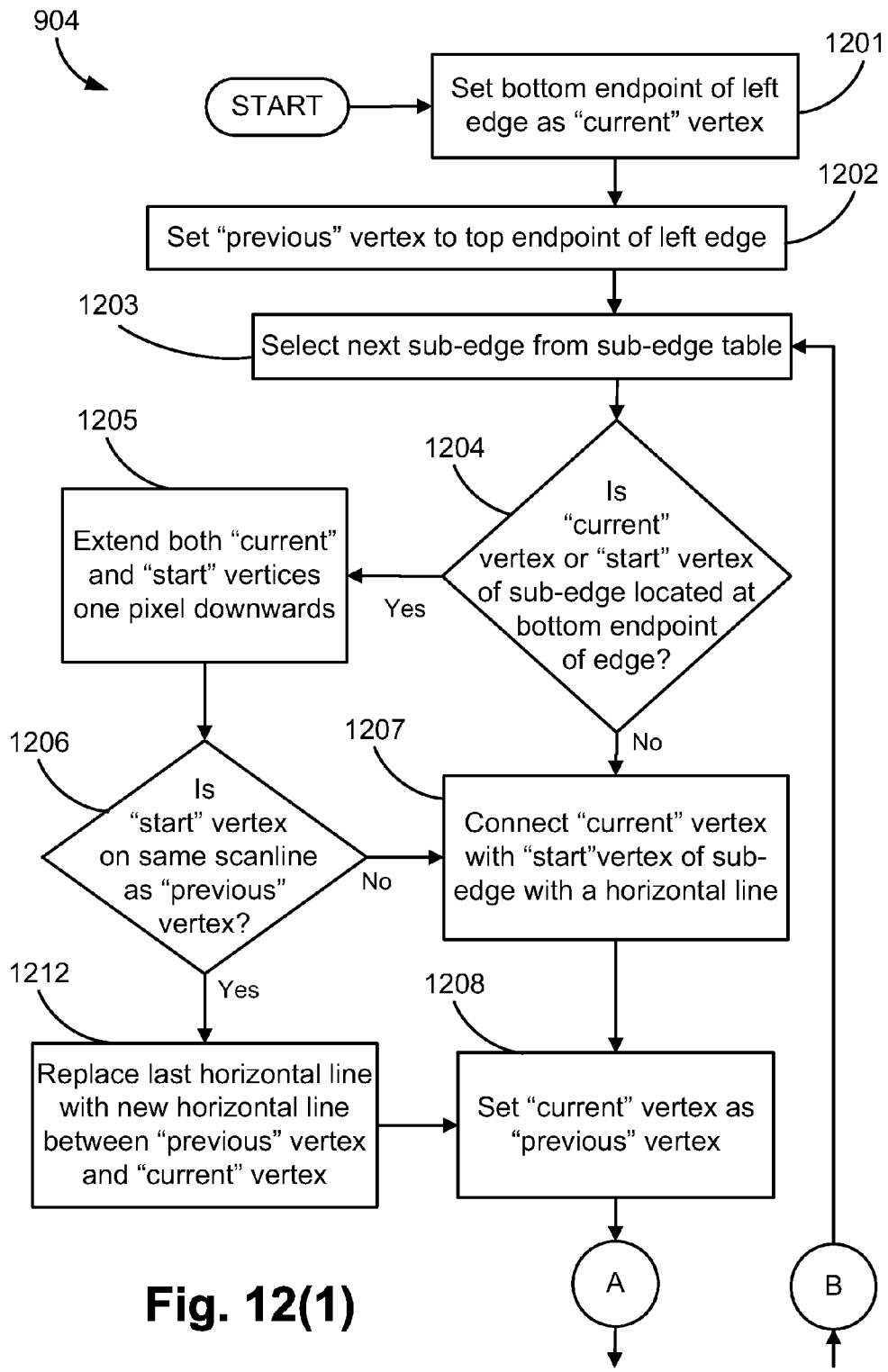
FIG. 12, spanning parts FIG. 12(1) and FIG. 12(2), is a schematic flow diagram illustrating a method of combining an edge with associated sub-edges to form a region's boundary.
Figure 12:
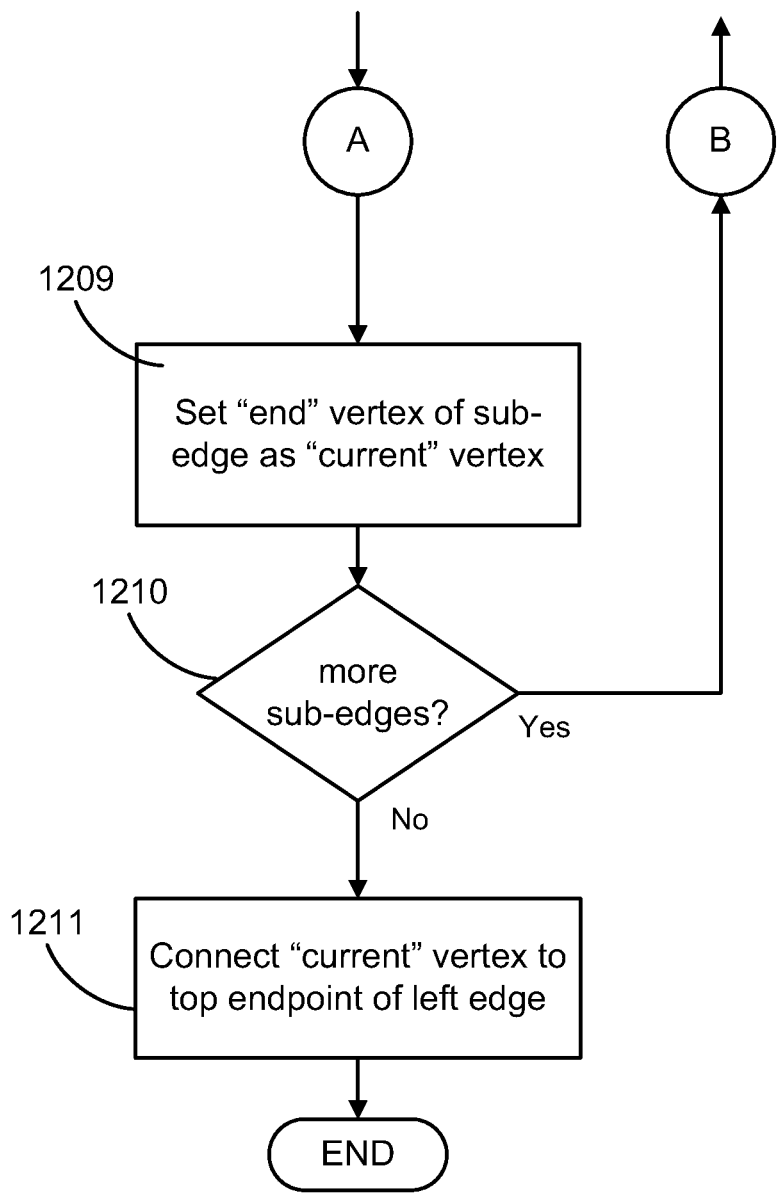

At step 1208, process 904 updates the value of the "previous" vertex to be equal to the "current" vertex, and at step 1209 (FIG. 12(2)), process 904 updates the value of the "current" vertex to be equal to the "end" vertex of the selected sub-edge. Process 904 then proceeds to step 1210 where it is determined if there are more sub-edges in the table. If so, process 904 returns to selection step 1203 (FIG. 12(1)) where the next sub-edge is retrieved from the sub-edge table. If on the other hand, it is determined that there are no more sub-edges left, process 904 proceeds to connection step 1211, where the "current" vertex, representing the "end" vertex of the last sub-edge, is connected to the vertex at the top endpoint of the left edge with a horizontal line segment. The boundary for the region has been fully determined and process 904 terminates.

An alternative edge-based representation can avoid the need for the one-pixel extension step 1205 of process 904 as well as the need to record whether the vertex is located at the bottom endpoint of an edge as in step 805 of process 702. For example, the edge data can be augmented to include a point at the bottom-left co-ordinates of each pixel as well as the top-left. However, in order to correctly process such an augmented representation, process 903 must be extended to handle the possibility of multiple vertices on a scan line belonging to the same edge.

To illustrate the procedure of process 904, edge 101 and the corresponding sub-edge table 420 as shown in FIG. 4B will be used. Process 904 initially receives left edge 101 and a set of sub-edges shown in table 420. At steps 1201 and 1202, vertex 312 at the bottom endpoint of the left edge is used to initialise the value of the "current" vertex and vertex 311 at the top endpoint of the left edge is used to initialise the value of the "previous" vertex. At step 1203, sub-edge 404 in entry 421*e* of sub-edge table 420 is selected. At step 1204, it is determined that "current" vertex 312 and "start" vertex 320 (on sub-edge 404) are located at the bottom endpoint of an edge (edge 204), hence process 904 proceeds to step 1205 where "current" vertex 312 and "start" vertex 320 are shifted down one pixel in FIG. 4A to vertices 421 and 423 respectively. This has the effect of extending the height of edge 101 and sub-edge 404 by one pixel. Process 904 proceeds to step 1206, where it is determined that "current" vertex 421 is not on the same scan line as "previous" vertex 311, hence process proceeds to step 1207, where "current" vertex 421 is connected to "start" vertex 423 of selected sub-edge 404 with a horizontal line segment. Process 904 proceeds to steps 1208 and 1209, where the "previous" vertex is updated to be equal to the "current" vertex 421, and the "current" vertex is updated to be equal to "end" vertex 319 of sub-edge 404. Process 904 proceeds to step 1210 where it is determined that there are more sub-edges to be processed, hence the process returns to step 1203, where sub-edge 402 in entry 422*e* of FIG. 4B is selected.

An example of when an edge will not be extended ('NO' case of step 1204) will now be described. After processing sub-edges 404 and 402, and updating "previous" vertex to vertex 319 and "current" vertex to vertex 313, process 904 reaches step 1203. At step 1203, sub-edge 403 in entry 423 is selected. "Current" vertex 313 and "start" vertex 318 of sub-edge 403 are not located at bottom endpoint of the edges which the sub-edges were formed from (edge 102 and edge 204), hence process proceeds to step 1207, where a horizontal line segment is added between "current" vertex 313 and "start" vertex 318.

An example of when the boundary of the region for edge 101 is completed will now be described. Continuing the earlier example of processing sub-edge 403 after step 1207, process 904 proceeds to step 1208 and 1209, where the "previous" vertex is set to vertex 313 and the "current" vertex is set to vertex 317. At step 1210, all sub-edges have been processed, thus process 904 proceeds to step 1211. At step 1211, "current" vertex 317 is connected to vertex 311, which is located at the top endpoint of edge 101, by a horizontal line segment. The boundary 431 of the region 111 has been fully determined as shown in FIG. 4C, and process 904 terminates. The boundary 431 is formed by the endpoints 311,312 of the edge 101 and the neighbouring vertices, in order, 320, 319, 314, 313, 318 and 317.

Figure 14:
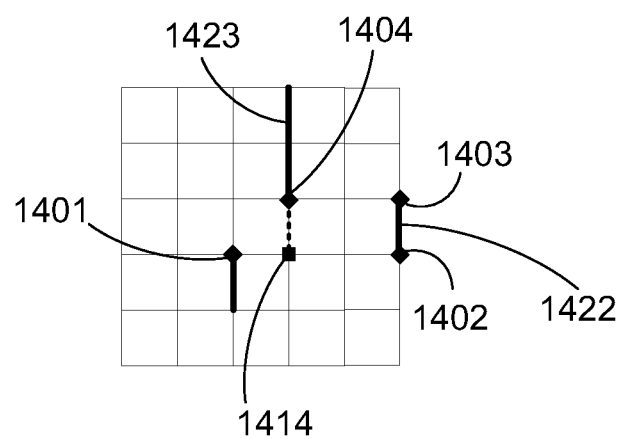
FIG. 14 shows an example of how a one pixel high edge may be "covered"

An example of how process 904 handles the case where a one pixel high sub-edge is "covered" by another sub-edge will now be describe with reference to FIG. 14. In this scenario, process 904 has reached step 1203 and has selected sub-edge 1423. The "start" vertex is set to vertex 1404, "previous" vertex is set to vertex 1401, and the "current" vertex is vertex 1403. By this stage, there is a horizontal line segment between vertex 1401 and 1402, and sub-edge 1422 is currently considered part of the boundary. At step 1204, it is determined that "start" vertex 1404 is located at the bottom endpoint of an edge, thus process 904 proceeds to step 1205, where the "start" vertex is extended to vertex 1414, and the "current" vertex is extended to vertex 1402. At step 1206, it is determined that "start" vertex 1414 lies on the same scan line as "previous" vertex 1401. Hence the horizontal line segment between vertex 1401 and 1402 is now replaced with a horizontal line segment between vertex 1401 and 1414. This effectively "covers" sub-edge 1422.

Second Implementation

Figure 15:
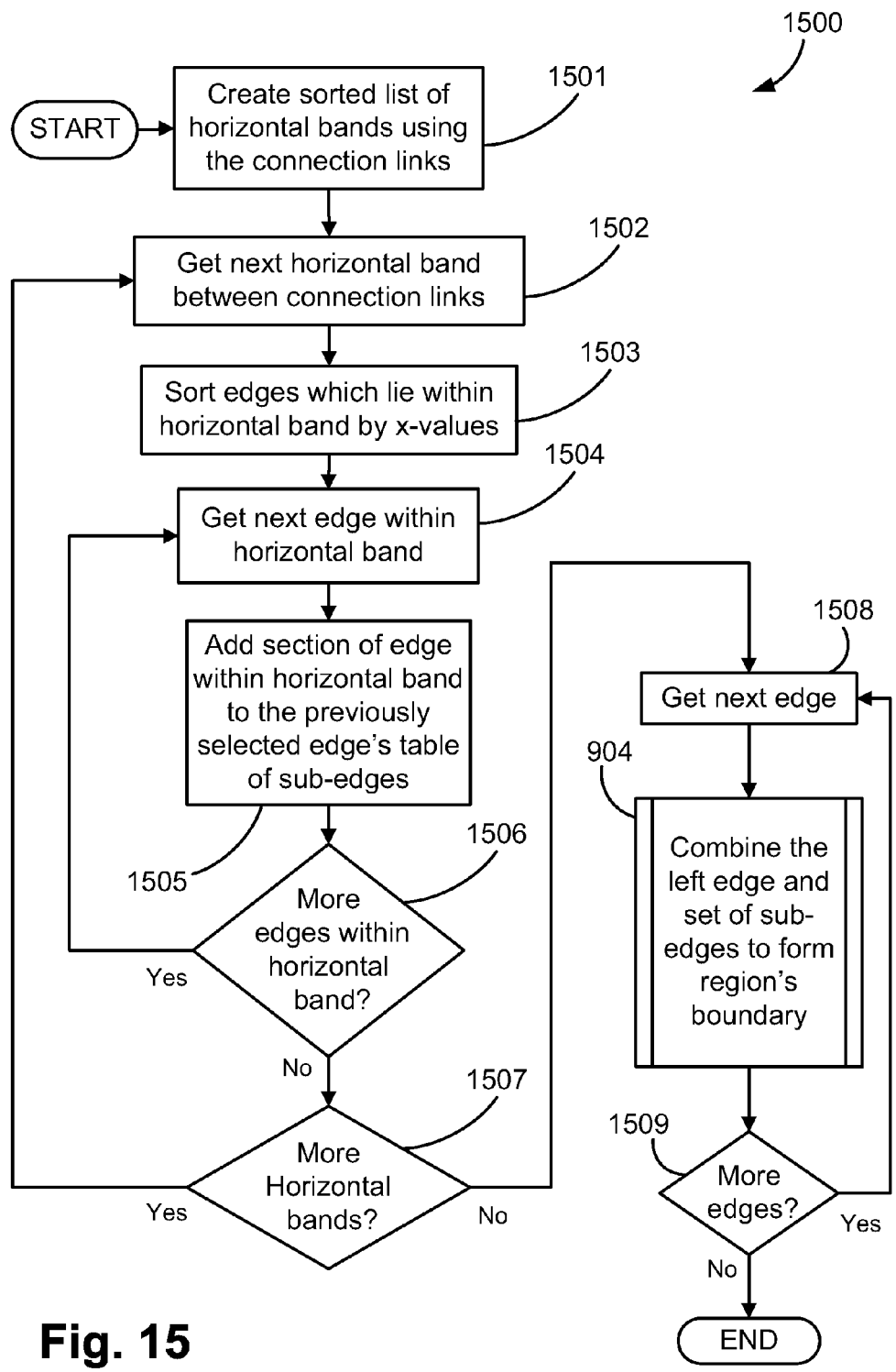
FIG. 15 is a schematic flow diagram illustrating an alternative method of determining the set of sub-edges which forms the right-hand side of a region's boundary.
Figure 16:
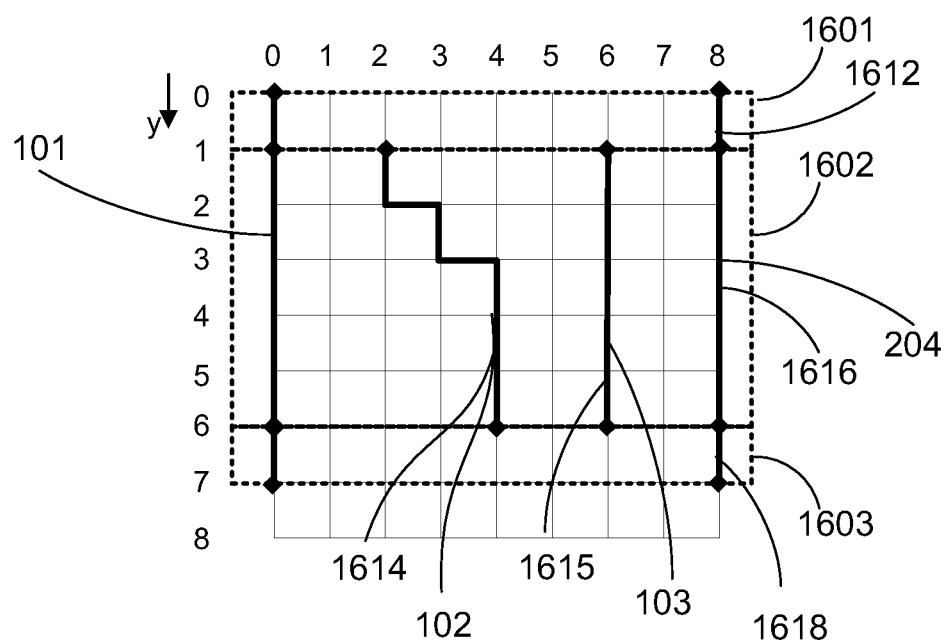

An alternative implementation will now be described with reference to FIG. 15, in which process 703 is replaced by process 1500. In this implementation process 700 of FIG. 7 receives an edge-based representation 620 in step 701, and determines connections between edges in sub-process 702 as previously described. Process 700 then invokes sub-process 1500 instead of sub-process 703. In process 1500, a set of sorted horizontal bands is generated from the edge-based representation 620, such that all connection links coincide with the top or the bottom of a band. The sub-edges within each band are also sorted in sequential order. Process 1500 builds a sub-edge table for an edge by considering each band over which the edge is active, and adding the nearest sub-edge to the right of the edge from the sorted set of sub-edges within that band.

Like process 703, process 1500 operates on a set of edges and connection data determined by process 702, such as the set of edge and connections link data 300. At step 1501, a list of horizontal bands is created in the memory 1706 using the connection links in the edges. Each horizontal band is the largest interval in the Y direction such that no connection links are contained within the band. This means that one or more connection links coincide with the upper and lower boundaries of each band. These horizontal bands are combined in a list starting from the bottom-most horizontal band first. For example, in table 300 in FIG. 3A, connection links lie on scan lines 0, 1, 6, and 7. In this case step 1501 generates a list of three horizontal bands depicted in FIG. 16: band 1603 (between scan lines 6 and 7), followed by band 1602 (between scan lines 1 and 6), followed by band 1601 (between scan lines 0 and 1).

Process 1500 proceeds to step 1502, where the first horizontal band is retrieved from the list. In the example, band 1603 is retrieved from the list.

At step 1503, process 1500 determines the edges which partly or fully lie within the selected horizontal band 1603 and sorts these edges according to their X values within the band in ascending order. Alternatively, the sub-edges within the horizontal band 1603 are sorted, providing that an original edge can be determined given a sub-edge. In either case, a unique sorting is guaranteed because edges in the edge-based representation do not overlap and are monotonic in the Y direction (that is, an edge contains no more than one X value at any given Y value), and because each edge within a band covers the full extent of the band in the Y direction. In the example, edges 101 and 204 are determined to lie within horizontal band 1603 because both edges extend over the Y co-ordinates of the band 1603, namely Y=6 to Y=7. Edges 102 and 103 are not within horizontal band 1603 because these edges do not extend over the Y co-ordinates of the band 1603. Edges 101 and 204 are sorted according to their X values within a scan line within the band (for example, the top-most scan line). The X value of edge 101 at Y=6 is 0, while the X value of edge 204 at Y=6 is 8, and so edge 101 is sorted so that it precedes edge 204.

Process 1500 proceeds to step 1504, where the next edge within the horizontal band is selected. This may be done by getting the next edge from the sorted list of edges produced at step 1503. In the example, no edge has yet been selected, and so edge 101 is selected as the next edge. Process 1500 then proceeds to step 1505, where the section of the edge within the horizontal band is added to the table of sub-edges for the previously selected edge. In the example, edge 101 is the first edge to be selected, and there is no previously edge selected edge. Hence no sub-edges of edge 101 are added to any sub-edge table.

Process 1500 proceeds to step 1506 where it determines if there are more edges within the horizontal band (this may be done by checking the sorted list of edges produced at step 1503). If so, process 1500 returns to step 1504 to process the next edge within the band; otherwise, process 1500 continues to step 1507. In the example, there is still one more edge left, and so process 1500 returns to step 1504 where edge 204 is retrieved. This time at step 1505, the part of edge 204 that lies within horizontal band 1603, namely sub-edge 1618, is added to the table of sub-edges for the previously selected edge 101. At step 1506, it is determined that there are no more edges within horizontal band 1603, hence process 1500 proceeds to step 1507.

Step 1507 determines whether there are more horizontal bands. If so, process 1500 returns to step 1502 to process the next band; otherwise, the sub-edge tables for all edges have been completed, and so process 1500 proceeds to step 1508.

Continuing the example, there are still two more horizontal bands at step 1507, and so process 1500 returns to step 1502 when the next horizontal band 1602 is selected. Process 1500 repeats steps 1503 to 1506 for band 1602, adding sub-edge 1614 to the sub-edge table of edge 101, sub-edge 1615 to the sub-edge table of edge 102, and sub-edge 1616 to the sub-edge table of edge 103. Step 1507 determines that there is another horizontal band to process, thus process 1500 returns to step 1502, where horizontal band 1601 is selected. Process 1500 repeats steps 1503 to 1506 once again and sub-edge 1612 is added to the sub-edge table of edge 101. Finally, at step 1507, it is determined that there are no more horizontal bands left, and so process 1500 proceeds to step 1508.

At step 1508, all edges now have a complete table of sub-edges which together can be used to form right side of the boundary of the implicit region associated with the edge. The sub-edge tables generated by steps 1501 to 1508 are identical to those generated by the previously described sub-process 903. For example, the sub-edge table for the edge 101 contains sub-edges 1618, 1614, and 1612. These are identical to sub-edges 404, 402, and 403 determined by sub-process 903, as shown in FIG. 4A and table 420 in FIG. 4B. Returning to the flowchart of FIG. 15, steps 1508, 904, and 1509 operate to generate the boundary for each edge in turn. Step 1508 gets the next left edge in the edge-based representation. Process 1500 then invokes process 904, which combines the left edge with the sub-edges in the sub-edge table of the left edge to form a boundary, as previously described with reference to FIG. 12. Process 1500 continues at step 1509, where it is determined if there are any more edges in the edge-based representation. If so, process 1500 returns to step 1508 to process the next edge. If not, process 1500 terminates, and process 700 of FIG. 7 continues at step 704 to associate each region formed with the fill value of the region's left edge, as previously described.

In the example, fetching step 1508 and decision step 1509 operate to invoke previously described process 904 three times, in which edge 101 is combined with its sub-edges 1618, 1614; edge 102 with its sub-edge 103; and finally edge 103 with its sub-edge 204. Step 704 of process 700 then associates fills 105, 106, and 107 with the regions formed from respective edges 101, 102, and 103, to form complete objects 111, 112, and 113 respectively.

Objects 111, 112, and 113 comprise a non-overlapping object-based representation, as required by RIP module 614. RIP module 614 applies further processing, such as rasterisation.

Example(s)/User Cases(s)

The arrangements described may be used to generate graphical objects from the edge-based representation 620. A graphical object consists of a fill and a closed path representing the boundary of the object. Thus, the regions (e.g. 111, 112, 113) determined by process 700 can be used to represent the graphical objects within the page described by the input PDL document 611.

Figure 5A:
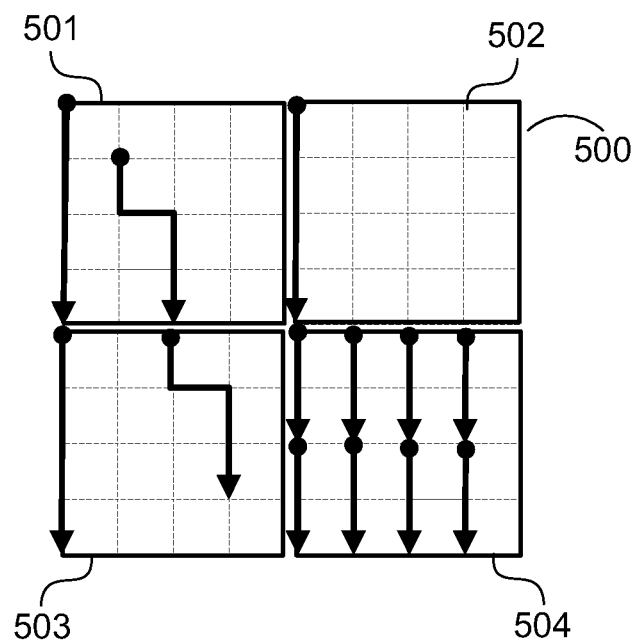
FIG. 5A shows an example of a tiled page with one complex tile.

While the arrangements above are described with respect to processing a page, the same processes can be applied to a tiled page, where the regions in each tile are represented by the edge-based representation 620 for each tile. Because the content of each tile is independent of one another, each tile can be treated a separate "page", and the methods above can be applied to each tile. FIG. 5A shows an example of page 500 represented by four tiles numbered from 501 to 504. Note that page 500 is deliberately drawn with gaps in between tiles to make it easier to identify the tiles, although in practice there are no gaps in between tiles. The regions in each tile are represented by the edge-based representation 620 of the tile. Hence in order to determine all regions within page 500, tiles 501 to 504 are processed separately using process 700 as described in FIG. 7.

When generating graphical objects from a tiled page, it may be efficient to rasterise the entire tile into an image (if the tile is complex) and consider the perimeter of the tile as the boundary of the region, with the image as the fill. A tile is considered to be complex if complexity value for the tile exceeds a complexity threshold. For instance, the measure of complexity can be, but is not limited to, the number of edges in a tile. For the purpose of keeping the example simple, the number of edges for the complexity threshold can be set to 7 edges. If a tile contains more than 7 edges, a single region is produced, where the boundary is the perimeter of the tile and the fill is the image representing the rasterised tile. Other numbers of edges may be used for the threshold.

Figure 13:
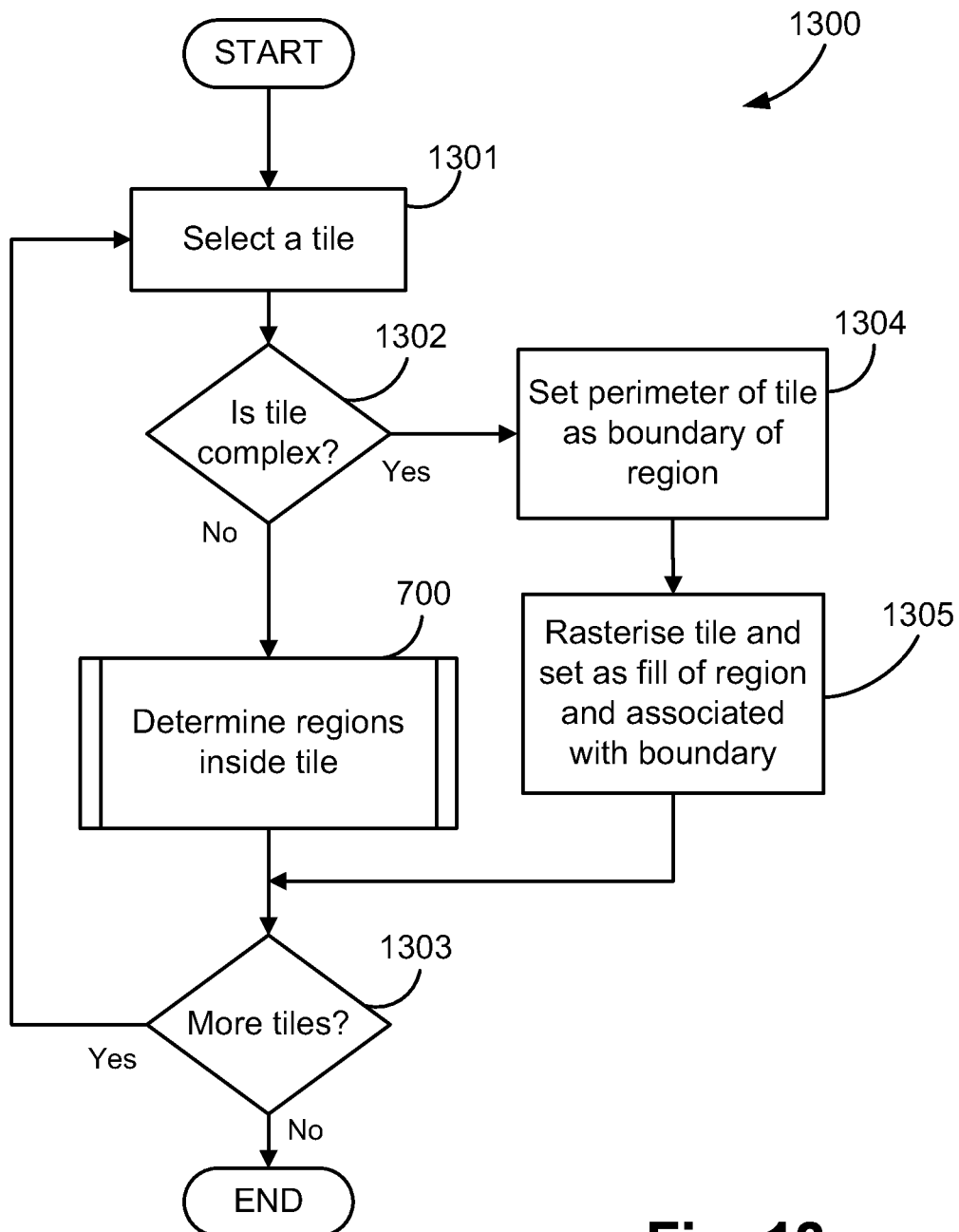
FIG. 13 is a schematic flow diagram illustrating a method of handling pages with complex tiles where each tile is represented by an edge-based representation.

A process 1300 for generating regions and thus the graphical objects, for a page containing complex tiles will now be described with reference to the flowchart of FIG. 13. The process 1300 is preferably implemented in software stroked on the HDD 1710 and executed by the processor 1705. Process 1300 initially receives a tiled page, which may be stored in the memory 1706, and where the regions in each tile are represented by an intermediate (page) presentation in each tile. Process 1300 starts at step 1301 where a tile of the tiled page is selected. Process 1300 then proceeds to selection step 1302 where it is determined if the selected tile is complex. If the number of edges in the tile is less than the complexity threshold (for example 7 edges), the process 1300 proceeds to invoke process 700 described above, where the regions in the tile are determined Otherwise, process 1300 proceeds to step 1304, where the perimeter of the tile is set as the boundary of the region. Process 1300 then proceeds to step 1305 where the content of the tile is rasterised into a (pixel-based) image using a known method, such as scan line-fill algorithm. The image is used as the fill and associated with the boundary determined at step 1304. This forms the region for the complex tile. For either path, process 1300 will proceed to step 1303, where it is determined if there are more tiles to be processed. If there are more tiles, process 1300 returns to step 1301, otherwise all tiles have been processed and process 1300 terminates.

Figure 5B:
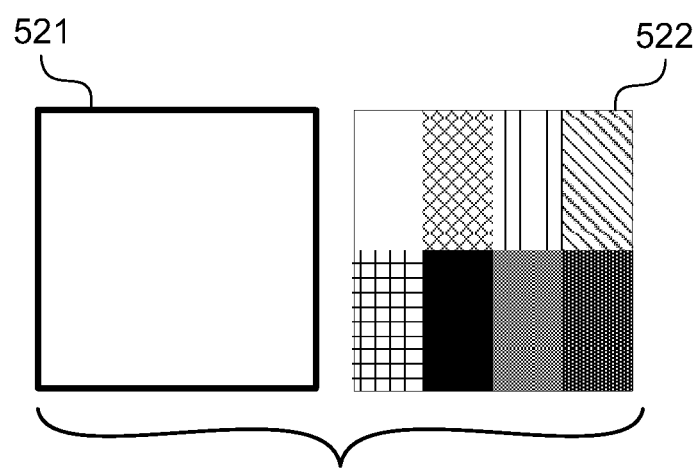
FIG. 5B shows an example of the boundary and fill produced for tile 504 in FIG. 5A.

An example of the process 1300 will now be described with reference to FIG. 5A and FIG. 5B. Process 1300 initially receives page 500 with tiles 501 to 504. At step 1301, tile 501 is selected. At step 1302, it is determined that tile 501 is not complex as it has 2 edges, which is less than the predetermined complexity threshold of 7. By invoking process 700, the region of tile 501 is determined. At step 1303, it is determined that there are more tiles to be processed, hence process 1300 returns to step 1301 where the next tile, 502 is selected. Tile 502 and subsequently tile 503 follows the same procedure as tile 501. After tile 503 has been processed, tile 504 is selected at step 1301. At step 1302, it is determined that tile 504 is complex as it contains 8 edges, which exceeds the current predetermined complexity threshold. Hence process 1300 proceeds to step 1304, where the perimeter of tile 504 is set as the boundary of the region as shown in FIG. 5B as 521. Process 1300 then proceeds to step 1305, where the entire tile is rasterised to an image as shown as fill 522. The pixel values are determined using the fills associated with each edge, using a known rendering technique such as scan line-fill algorithm. The boundary 521 is then associated with fill 522 forming the region for tile 504. Process 1300 then proceeds to step 1303, where it is determined that there are no more tiles to be processed. All regions and thus graphical objects have been determined and process 1300 terminates.

INDUSTRIAL APPLICABILITY

The arrangements described are applicable to the computer and data processing industries and particularly for the efficient handling of print jobs and the rendering and rasterising processes associated therewith.

The foregoing describes only some embodiments of the present invention, and modifications and/or changes can be made thereto without departing from the scope and spirit of the invention, the embodiments being illustrative and not restrictive.

The invention claimed is:

1. A method for graphics processing, the method comprising:
   receiving an intermediate graphical representation associated with a document, the intermediate graphical representation comprising a plurality of non-intersecting edges;
   determining a plurality of vertices using the intermediate graphical representation, the plurality of vertices comprising endpoints of the edges and at least one split point, the split point being determined by splitting a first edge into two or more portions using an endpoint of at least one second edge, wherein the first edge and the second edge are from the plurality of non-intersecting edges;
   associating vertices from the plurality of vertices with at least one edge from the intermediate graphical representation using endpoints of said one edge, wherein the associating comprises selecting, from the determined plurality of vertices, a plurality of neighbouring vertices to said one edge to define a region with the endpoints of said one edge; and
   processing the region using at least the endpoints of said one edge and the associated neighbouring vertices, thereby converting an edge-based representation into an intermediate non-overlapping object-based representation.

2. A method according to claim 1, wherein the plurality of neighbouring vertices used to define the region is determined by:
   identifying vertices arranged within scan lines bounded by the endpoints of said one edge; and
   for a scan line comprising at least one of the identified vertices, determining a first vertex on a next edge encountered on said scan line after said one edge.

3. A method according to claim 2 wherein the identified vertices include a second vertex which lies on said next edge, the second vertex being the nearest vertex in the set of identified vertices on said next edge to the first vertex, and a portion of said next edge in between the first and second vertices is the nearest to said one edge on the scan lines over which the portion of said one edge is active.

4. A method according to claim 3 wherein the splitting forms a sub-edge representing the portion of said next edge between the first and second vertices.

5. A method according to claim 1, wherein splitting the first edge into two or more portions comprises selecting the second edge determined by the intermediate graphical representation, so that the second edge is the closest edge to said first edge on a scan line associated with an endpoint of said second edge; and using said endpoint of the second edge to split the first edge.

6. A method according to claim 5 wherein the splitting further comprises projecting a ray from the endpoint of the second edge to a vertex on the first edge being the split point, and forming a sub-edge between the split point and an endpoint of the first edge.

7. A method according to claim 1, wherein associating the vertices with the one edge comprises traversing the determined plurality of vertices by starting from said one edge to form a closed path corresponding to the polygon associated with said one edge.

8. A method according to claim 1, wherein associating the vertices with the one edge comprises:
   forming a plurality of bands using the determined plurality of vertices;
   obtaining neighbouring sub-edges to said edge formed by the bands by sorting the edges within each band where said edge is present; and
   associating the obtained neighbouring sub-edges with said edge.

9. A method according to claim 1, wherein associating the vertices comprises joining a pair of vertices on the same scan line by a horizontal line.

10. A method according to claim 1, wherein each edge is pixel-aligned, has a direction of activation and a direction of non-activation, and is associated with a fill.

11. A method according to claim 10, wherein the region is associated with the fill of the one edge in the activating region.

12. A method according to claim 1, wherein the document is formed by a plurality of tiles each having an associated intermediate graphical representation, the method further comprising:
   for each tile determining a complexity based on the number of edges in the corresponding intermediate graphical representation; and
   selecting a tile based on the tile complexity to be converted into plurality of said regions.

13. A method for graphics processing, the method comprising:
   receiving an intermediate graphical representation, the intermediate graphical representation comprising a plurality of non-intersecting edges;
   determining a plurality of vertices using the intermediate graphical representation, the plurality of vertices comprising endpoints of the edges and at least one split point, the split point being determined by splitting a first edge into two or more portions using an endpoint of at least one second edge, wherein the first edge and the second edge are from the plurality of non-intersecting edges;

associating an edge from the intermediate graphical representation with at least a split point from the determined plurality of vertices to form a region corresponding to said edge, wherein associating comprises selecting a neighbouring split point to said edge from the determined plurality of vertices; and processing the graphics using the formed region, thereby converting an edge-based representation into an intermediate non-overlapping object-based representation.

14. A method of converting a first graphical representation to a second graphical representation, comprising:

receiving a first graphical representation of a plurality of non-overlapping regions, the representation comprising partial boundaries of said regions;

determining a plurality of vertices from the partial boundaries, the vertices comprising endpoints of the partial boundaries and at least one split point, the split point being determined by splitting a partial boundary into two or more portions using an endpoint of at least one other partial boundary;

associating a partial boundary from the first graphical representation with at least a split point from the determined plurality of vertices, wherein associating comprises selecting a neighbouring split point to said partial boundary from the determined plurality of vertices;

identifying a graphical object corresponding to said partial boundary by connecting endpoints of said partial boundary with the vertices associated with said partial boundary; and using the identified graphical object to form a second graphical representation, thereby converting an edge-based representation into an intermediate non-overlapping object-based representation.

15. A non-transitory computer readable storage medium having a program recorded thereon, the program being executable by a processor to process graphics, the program comprising:

code for receiving an intermediate graphical representation associated with a document, the intermediate graphical representation comprising a plurality of non-intersecting edges;

code for determining a plurality of vertices using the intermediate graphical representation, the plurality of vertices comprising endpoints of the edges and at least one split point, the split point being determined by splitting a first edge into two or more portions using an endpoint of at least one second edge, wherein the first edge and the second edge are from the plurality of non-intersecting edges;

code for associating vertices from the plurality of vertices with at least one edge from the intermediate graphical representation using endpoints of said one edge, wherein the associating comprises selecting, from the determined plurality of vertices, a plurality of neighbouring vertices to said one edge to define a region with the endpoints of said one edge; and code for processing the region using at least the endpoints of said one edge and the associated neighbouring vertices, thereby converting an edge-based representation into an intermediate non-overlapping object-based representation.

16. A non-transitory computer readable storage medium according to claim 15, wherein the plurality of neighbouring vertices used to define the region is determined by:

code for identifying vertices arranged within scan lines bounded by the endpoints of said one edge; and code for determining, for a scan line comprising at least one of the identified vertices, a first vertex on a next edge encountered on said scan line after said one edge.

17. A non-transitory computer readable storage medium according to claim 16 wherein the identified vertices include a second vertex which lies on said next edge, the second vertex being the nearest vertex in the set of identified vertices on said next edge to the first vertex, and a portion of said next edge in between the first and second vertices is the nearest to said one edge on the scan lines over which the portion of said one edge is active.

18. A computer apparatus comprising a processor and a memory, the memory storing a program executable by the processor to process graphics, the program comprising:

code for receiving an intermediate graphical representation associated with a document, the intermediate graphical representation comprising a plurality of non-intersecting edges;

code for determining a plurality of vertices using the intermediate graphical representation, the plurality of vertices comprising endpoints of the edges and at least one split point, the split point being determined by splitting a first edge into two or more portions using an endpoint of at least one second edge, wherein the first edge and the second edge are from the plurality of non-intersecting edges;

code for associating vertices from the plurality of vertices with at least one edge from the intermediate graphical representation using endpoints of said one edge, wherein the associating comprises selecting, from the determined plurality of vertices, a plurality of neighbouring vertices to said one edge to define a region with the endpoints of said one edge; and code for processing the region using at least the endpoints of said one edge and the associated neighbouring vertices, thereby converting an edge-based representation into an intermediate non-overlapping object-based representation.

19. A computer apparatus comprising a processor and a memory, the memory storing a program executable by the processor to process graphics, the program comprising:

code for receiving an intermediate graphical representation, the intermediate graphical representation comprising a plurality of non-intersecting edges;

code for determining a plurality of vertices using the intermediate graphical representation, the plurality of vertices comprising endpoints of the edges and at least one split point, the split point being determined by splitting a first edge into two or more portions using an endpoint of at least one second edge, wherein the first edge and the second edge are from the plurality of non-intersecting edges;

code for associating an edge from the intermediate graphical representation with at least a split point from the determined plurality of vertices to form a region corresponding to said edge, wherein associating comprises selecting a neighbouring split point to said edge from the determined plurality of vertices; and code for processing the graphics using the formed region, thereby converting an edge-based representation into an intermediate non-overlapping object-based representation.

20. A computer apparatus comprising a processor and a memory, the memory storing a program executable by the processor to convert a first graphical representation to a second graphical representation, the program comprising:
- code for receiving a first graphical representation of a plurality of non-overlapping regions, the representation comprising partial boundaries of said regions;
- code for determining a plurality of vertices from the partial boundaries, the vertices comprising endpoints of the partial boundaries and at least one split point, the split point being determined by splitting a partial boundary into two or more portions using an endpoint of at least one other partial boundary;
- code for associating a partial boundary from the first graphical representation with at least a split point from the determined plurality of vertices, wherein associating comprises selecting a neighbouring split point to said partial boundary from the determined plurality of vertices;
- code for identifying a graphical object corresponding to said partial boundary by connecting endpoints of said partial boundary with the vertices associated with said partial boundary; and
- code for using the identified graphical object to form a second graphical representation, thereby converting an edge-based representation into an intermediate non-overlapping object-based representation.

* * * * *